US012719631B2

(12) United States Patent
Wang et al.

(10) Patent No.: US 12,719,631 B2
(45) Date of Patent: Aug. 25, 2026

(54) SIGNAL TRANSMISSION METHOD AND DEVICE, TERMINAL, BASE STATION, AND STORAGE MEDIUM

(71) Applicant: DATANG MOBILE COMMUNICATIONS EQUIPMENT CO., LTD., Beijing (CN)

(72) Inventors: Jiaqing Wang, Beijing (CN); Meiying Yang, Beijing (CN); Chen Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 429 days.

(21) Appl. No.: 18/017,069

(22) PCT Filed: Jun. 17, 2021

(86) PCT No.: PCT/CN2021/100532
§ 371 (c)(1),
(2) Date: Jan. 19, 2023

(87) PCT Pub. No.: WO2022/017086
PCT Pub. Date: Jan. 27, 2022

(65) Prior Publication Data

US 2023/0318769 A1 Oct. 5, 2023

(30) Foreign Application Priority Data

Jul. 24, 2020 (CN) ......................... 202010725188.1

(51) Int. Cl.
*H04W 76/00* (2018.01)
*H04L 5/00* (2006.01)
(Continued)

(52) U.S. Cl.
CPC ....... *H04L 5/0048* (2013.01); *H04W 74/0833* (2013.01)

(58) Field of Classification Search
None
See application file for complete search history.

(56) References Cited

U.S. PATENT DOCUMENTS

2015/0244507 A1 8/2015 Sorrentino
2016/0021641 A1 1/2016 Nogami et al.
(Continued)

FOREIGN PATENT DOCUMENTS

CN 106549745 A 3/2017
CN 107113822 A 8/2017
(Continued)

OTHER PUBLICATIONS

European Patent Office, Extended European Search Report Issued in Application No. 21845637.4, Jun. 27, 2024, Germany, 10 pages.
(Continued)

*Primary Examiner* — Maharishi V Khirodhar
(74) *Attorney, Agent, or Firm* — KILPATRICK TOWNSEND & STOCKTON LLP

(57) ABSTRACT

Embodiments of the present application provide a signal transmission method and device, a terminal, a base station, and a storage medium. The method includes: receiving a target reference signal resource indicated by a base station by means of preset signaling; and receiving a reference signal according to the target reference signal resource. According to the methods and devices for signal transmission, the terminal, the base station, and the storage medium provided in the embodiments of the present application, a reference signal resource is configured for UE in a disconnected state by means of preset signaling, and the UE receives a reference signal by means of the configured
(Continued)

reference signal resource; thus, the performance of the system is improved, and the power consumption is reduced.

16 Claims, 4 Drawing Sheets

(51) Int. Cl.

| | |
|---|---|
| ***H04W 72/04*** | (2023.01) |
| ***H04W 88/08*** | (2009.01) |
| *H04W 74/0833* | (2024.01) |

(56) References Cited

U.S. PATENT DOCUMENTS

| | | | | |
|---|---|---|---|---|
| 2017/0237537 | A1 | 8/2017 | Nogami et al. | |
| 2018/0219664 | A1 * | 8/2018 | Guo | H04W 24/10 |
| 2018/0262313 | A1 | 9/2018 | Nam et al. | |
| 2020/0145173 | A1 | 5/2020 | Lyu | |
| 2020/0145981 | A1 * | 5/2020 | Harada | H04W 72/044 |
| 2020/0150254 | A1 * | 5/2020 | Manolakos | H04L 5/0053 |
| 2021/0136532 | A1 * | 5/2021 | Liu | H04W 4/06 |
| 2022/0094497 | A1 * | 3/2022 | Shibaike | H04L 1/0027 |
| 2023/0083399 | A1 * | 3/2023 | Wang | H04L 5/0051 370/329 |
| 2024/0243869 | A1 * | 7/2024 | Wang | H04L 5/0094 |
| 2025/0007667 | A1 * | 1/2025 | Luo | H04L 5/0051 |

FOREIGN PATENT DOCUMENTS

| | | | | |
|---|---|---|---|---|
| CN | 108111280 | A | 6/2018 | |
| CN | 109196930 | A | 1/2019 | |
| CN | 109391389 | A | 2/2019 | |
| CN | 109511156 | A | 3/2019 | |
| CN | 110690947 | A | 1/2020 | |
| CN | 111373814 | A | 7/2020 | |
| EP | 2995031 | B1 | 9/2018 | |
| KR | 20160110271 | A | 9/2016 | |
| TW | 202010338 | A | 3/2020 | |
| WO | 2018202130 | A1 | 11/2018 | |
| WO | 2019029325 | A1 | 2/2019 | |
| WO | 2019095875 | A1 | 5/2019 | |
| WO | 2020001532 | A1 | 1/2020 | |
| WO | WO-2021098056 | A1 * | 5/2021 | H04L 5/0048 |

OTHER PUBLICATIONS

Taiwan Patent Office, Office Action Issued in Application No. 110125621, Feb. 11, 2022, 16 pages.

Office Action of Corresponding Cn Patent Application No. 202010725188.1 dated Feb. 27, 2025.

Office Action of Corresponding CN Patent Application No. 202010725188.1 dated Aug. 8, 2025.

* cited by examiner

SSB SSB SSB PO

Receiving a target reference signal resource indicated by a base station through preset signaling — 301

Receiving a reference signal according to the target reference signal resource — 302

SIGNAL TRANSMISSION METHOD AND DEVICE, TERMINAL, BASE STATION, AND STORAGE MEDIUM

CROSS-REFERENCE TO RELATED APPLICATION

The present application is a National Stage of International Application No. PCT/CN2021/100532, filed on Jun. 17, 2021, which claims priority to Chinese application No. 2020107251881 filed on Jul. 24, 2020, entitled "Signal Transmission Method, Device, Terminal, Base Station and Storage Medium", which are hereby incorporated by reference in their entireties.

FIELD

The present application relates to the field of communication, and in particular, to methods and devices for signal transmission, a terminal, a base station, and a storage medium.

BACKGROUND

In the 5th generation mobile communication (5G) new radio (NR) system, following are three RRC states of user equipment (UE): an RRC_IDLE mode, an RRC_INACTIVE mode and a RRC_CONNECTED mode.

In the related art, some low-complexity NR UEs mainly operates in a disconnected state (including an RRC_IDLE mode and an RRC_INACTIVE mode). UE will receive paging information and system information (SI), and needs to receive a synchronization signal block (SSB) to perform time/frequency tracking and automatic gain control (AGC) operations before receiving paging information at a paging occasion (PO). If the time between the timing at which SSB is received and PO is longer, the accuracy of the time/frequency tracking will deteriorate paging reception performance. In order to obtain better time/frequency tracking performance, multiple SSBs are often required to perform time/frequency (T/F) tracking to improve accuracy for precision synchronization.

However, multiple SSBs are required to perform time/frequency tracking for UE in a disconnected state in the related art, which will undoubtedly further prolong a time to wake up UE, and increase power consumption of UE.

SUMMARY

Embodiments of the present disclosure provide methods and devices for signal transmission, a terminal, a base station, and a storage medium which can solve the defect in the related art that multiple SSBs are required to perform time/frequency tracking, improve system performance, and reduce power consumption.

According to an embodiment of the present application, a method for signal transmission is provided, including:

receiving a target reference signal resource indicated by a base station through preset signaling; and receiving a reference signal according to the target reference signal resource.

According to the method for signal transmission in an embodiment of the present application, the preset signaling includes any one or more of the following items: system information, random access response information, and paging information.

According to the method for signal transmission in an embodiment of the present application, the target reference signal resource includes one or more scrambling identifications.

According to the method for signal transmission in an embodiment of the present application, the number of the target reference signal resources is determined by the base station according to a first preset rule.

According to the method for signal transmission in an embodiment of the present application, in case that the preset signaling is the system information, the receiving the target reference signal resource indicated by the base station through the preset signaling includes:

receiving a first reference signal resource set indicated by the base station through the system information, where the first reference signal resource set includes one or more reference signal resources; and determining the target reference signal resource according to the first reference signal resource set.

According to the method for signal transmission in an embodiment of the present application, the system information is associated with transmission contents or with transmission resources.

According to the method for signal transmission in an embodiment of the present application, the determining the target reference signal resources according to the first reference signal resource set includes:

obtaining the target reference signal resource from the first reference signal resource set according to a second preset rule.

According to the method for signal transmission in an embodiment of the present application, the obtaining the target reference signal resource from the first reference signal resource set according to a second preset rule includes:

obtaining, from the first reference signal resource set, one or more reference signal resource as the target reference signal resource according to a first threshold obtained in advance, where the target reference signal resource includes multiple resources in case that a first bandwidth for UE is smaller than the first threshold, and the target reference signal resource includes one resource in case that the first bandwidth for UE is greater than or equal to the first threshold; or obtaining, from the first reference signal resource set, one or more reference signal resource as the target reference signal resource according to a second threshold obtained in advance, where the target reference signal resource is a resource having a signal quality greater than the second threshold when UE receives a reference signal; or obtaining, from the first reference signal resource set, one or more reference signal resource as the target reference signal resource according to a first number N obtained in advance, where the target reference signal resource is N resources having a best signal quality when UE receives a reference signal, or N resources having a maximum bandwidth when UE receives a reference signal; or obtaining, from the first reference signal resource set, one or more reference signal resource as the target reference signal resource according to a third threshold and a fourth threshold obtained in advance, where the target reference signal resource is a resource having a bandwidth greater than the third threshold when UE receives a reference signal and a signal quality greater than the fourth threshold.

According to the method for signal transmission in an embodiment of the present application, in case that the preset signaling is the system information, the receiving the target reference signal resource indicated by the base station through the preset signaling includes:

receiving a first reference signal resource set indicated by the base station through first system information, where the first reference signal resource set includes one or more reference signal resources;

receiving an index value of the target reference signal resource indicated by the base station through second system information; and obtaining the target reference signal resources from the first reference signal resource set according to the index value.

According to the method for signal transmission in an embodiment of the present application, the system information is indicated by the base station after receiving random access request information sent by UE.

According to the method for signal transmission in an embodiment of the present application, in case that the preset signaling is the random access response information and the paging information, the receiving the target reference signal resource indicated by the base station through the preset signaling includes:

receiving a first reference signal resource set indicated by the base station through the random access response information, where the first reference signal resource set includes one or more reference signal resources;

receiving an index value of the target reference signal resource indicated by the base station through the paging information; and obtaining the target reference signal resources from the first reference signal resource set according to the index value.

According to the method for signal transmission in an embodiment of the present application, in case that the preset signaling is the random access response information and the system information, the receiving the target reference signal resource indicated by the base station through the preset signaling includes:

receiving a first reference signal resource set indicated by the base station through the random access response information, where the first reference signal resource set includes one or more reference signal resources;

receiving an index value of the target reference signal resource indicated by the base station through the system information; and obtaining the target reference signal resources from the first reference signal resource set according to the index value.

According to the method for signal transmission in an embodiment of the present application, after receiving the reference signal according to the target reference signal resource, the method further includes:

receiving indication information indicated by the base station through the system information, the paging information or downlink control information, where the indication information is used for indicating a change of the first reference signal resource set.

According to the method for signal transmission in an embodiment of the present application, the first reference signal resource set is a subset of a second reference signal resource set, and the second reference signal resource set refers to a set of reference signal resources configured by a base station for UE in the RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource, and the originally configured resource is a resource configured in the first reference signal resource set or a subset of the first reference signal resource set.

According to an embodiment of the present application, a method for signal transmission is further provided, including:

indicating a target reference signal resource to user equipment (UE) through preset signaling; and sending a reference signal to UE using the target reference signal resource.

According to the method for signal transmission in an embodiment of the present application, the preset signaling includes any one or more of the following items: system information, random access response information, and paging information.

According to the method for signal transmission in an embodiment of the present application, the target reference signal resource includes one or more scrambling identifications.

According to the method for signal transmission in an embodiment of the present application, before indicating the target reference signal resource to UE through the preset signaling, the method further includes:

determining the number of the target reference signal resources according to a first preset rule.

According to the method for signal transmission in an embodiment of the present application, in case that the preset signaling is the system information, the indicating the target reference signal resource to UE through the preset signaling includes:

indicating a first reference signal resource set to UE through system information for UE determining the target reference signal resource according to the first reference signal resource set, where the first reference signal resource set includes one or more reference signal resources.

According to the method for signal transmission in an embodiment of the present application, the system information is associated with transmission contents or with transmission resources.

According to the method for signal transmission in an embodiment of the present application, in case that the preset signaling is the system information, the indicating the target reference signal resource to UE through the preset signaling includes:

indicating a first reference signal resource set to UE through first system information, where the first reference signal resource set includes one or more reference signal resources; and indicating an index value of the target reference signal resource to UE through second system information for UE obtaining the target reference signal resource from the first reference signal resource set according to the index value.

According to the method for signal transmission in an embodiment of the present application, before indicating the target reference signal resource to UE through the preset signaling, the method further includes:

receiving random access request information sent by UE.

According to the method for signal transmission in an embodiment of the present application, in case that the preset signaling is the random access response information and the paging information, the indicating the target reference signal resource to UE through preset signaling includes:

indicating a first reference signal resource set to UE through the random access response information, where the first reference signal resource set includes one or more reference signal resources; and indicating an index value of the target reference signal resource to UE through the paging information for UE obtaining the target reference signal resource from the first reference signal resource set according to the index value.

According to the method for signal transmission in an embodiment of the present application, in case that the preset signaling is the random access response information and the system information, the indicating the target reference signal resource to UE through preset signaling includes:

indicating a first reference signal resource set to UE through the random access response information, where the first reference signal resource set includes one or more reference signal resources; and indicating an index value of the target reference signal resource to UE through the system information for UE obtaining the target reference signal resource from the first reference signal resource set according to the index value.

According to the method for signal transmission in an embodiment of the present application, after sending the reference signal to UE using the target reference signal resource, the method further includes:

indicating indication information to UE through the system information, the paging information or downlink control information, where the indication information is used for indicating a change of the first reference signal resource set.

According to the method for signal transmission in an embodiment of the present application, the first reference signal resource set is a subset of a second reference signal resource set, and the second reference signal resource set refers to a set of reference signal resources configured by a base station for UE in the RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource, and the originally configured resource is a resource configured in the first reference signal resource set or a subset of the first reference signal resource set.

According to an embodiment of the present application, a device for signal transmission is further provided, including:

a first receiving device, configured to receive a target reference signal resource indicated by a base station through preset signaling; and a second receiving device, configured to receive a reference signal according to the target reference signal resource.

According to an embodiment of the present application, a device for signal transmission is further provided, including:

a configuration device, configured to indicate a target reference signal resource to user equipment (UE) through preset signaling; and a sending device, configured to send a reference signal to UE using the target reference signal resource.

According to an embodiment of the present application, a terminal is further provided, including a memory having stored thereon programs, and a processor, and the programs, when executed by the processor, cause the processor to perform the following steps of:

receiving a target reference signal resource indicated by a base station through preset signaling; and receiving a reference signal according to the target reference signal resource.

According to the terminal in an embodiment of the present application, the preset signaling includes any one or more of the following items: system information, random access response information, and paging information.

According to the terminal in an embodiment of the present application, the target reference signal resource includes one or more scrambling identifications.

According to the terminal in an embodiment of the present application, the number of the target reference signal resources is determined by the base station according to a first preset rule.

According to the terminal in an embodiment of the present application, in case that the preset signaling is the system information, the receiving the target reference signal resource indicated by the base station through the preset signaling includes:

receiving a first reference signal resource set indicated by the base station through the system information, where the first reference signal resource set includes one or more reference signal resources; and determining the target reference signal resource according to the first reference signal resource set.

According to the terminal in an embodiment of the present application, the system information is associated with transmission contents or with transmission resources.

According to the terminal in an embodiment of the present application, the determining the target reference signal resources according to the first reference signal resource set includes:

obtaining the target reference signal resource from the first reference signal resource set according to a second preset rule.

According to the terminal in an embodiment of the present application, the obtaining the target reference signal resource from the first reference signal resource set according to a second preset rule includes:

obtaining, from the first reference signal resource set, one or more reference signal resource as the target reference signal resource according to a first threshold obtained in advance, where the target reference signal resource includes multiple resources in case that a first bandwidth for UE is smaller than the first threshold, and the target reference signal resource includes one resource in case that the first bandwidth for UE is greater than or equal to the first threshold; or obtaining, from the first reference signal resource set, one or more reference signal resource as the target reference signal resource according to a second threshold obtained in advance, where the target reference signal resource is a resource having a signal quality greater than the second threshold when UE receives a reference signal; or obtaining, from the first reference signal resource set, one or more reference signal resource as the target reference signal resource according to a first number N obtained in advance, where the target reference signal resource is N resources having a best signal quality when UE receives a reference signal or N resources having a maximum bandwidth when UE receives a reference signal; or obtaining, from the first reference signal resource set, one or more reference signal resource as the target reference signal resource according to a third threshold and a fourth threshold obtained in advance, where the target reference signal resource is a resource having a bandwidth greater than the third threshold when UE receives a reference signal and a signal quality greater than the fourth threshold.

According to the terminal in an embodiment of the present application, in case that the preset signaling is the system information, the receiving the target reference signal resource indicated by the base station through the preset signaling includes:

receiving a first reference signal resource set indicated by the base station through first system information, where the first reference signal resource set includes one or more reference signal resources receiving an index value of the target reference signal resource indicated by the base station through second system information; and obtaining the target reference signal resources from the first reference signal resource set according to the index value.

According to the terminal in an embodiment of the present application, the system information is indicated by the base station after receiving random access request information sent by UE.

According to the terminal in an embodiment of the present application, in case that the preset signaling is the random access response information and the paging information, the receiving the target reference signal resource indicated by the base station through the preset signaling includes:

receiving a first reference signal resource set indicated by the base station through the random access response information, where the first reference signal resource set includes one or more reference signal resources;

receiving an index value of the target reference signal resource indicated by the base station through the paging information; and obtaining the target reference signal resources from the first reference signal resource set according to the index value.

According to the terminal in an embodiment of the present application, in case that the preset signaling is the random access response information and the system information, the receiving the target reference signal resource indicated by the base station through the preset signaling includes:

receiving a first reference signal resource set indicated by the base station through the random access response information, where the first reference signal resource set includes one or more reference signal resources;

receiving an index value of the target reference signal resource indicated by the base station through the system information; and obtaining the target reference signal resources from the first reference signal resource set according to the index value.

According to the terminal in an embodiment of the present application, after receiving the reference signal according to the target reference signal resource, the method further includes:

receiving indication information indicated by the base station through the system information, the paging information or downlink control information, where the indication information is used for indicating a change of the first reference signal resource set.

According to the terminal in an embodiment of the present application, the first reference signal resource set is a subset of a second reference signal resource set, and the second reference signal resource set refers to a set of reference signal resources configured by a base station for UE in the RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource and the originally configured resource is a resource configured in the first reference signal resource set or a subset of the first reference signal resource set.

According to an embodiment of the present application, a base station is further provided, including a memory having stored thereon programs, and a processor, and the programs, when executed by the processor, cause the processor to perform the following steps of:

indicating a target reference signal resource to user equipment (UE) through preset signaling; and sending a reference signal to UE using the target reference signal resource.

According to the base station in an embodiment of the present application, the preset signaling includes any one or more of the following items: system information, random access response information, and paging information.

According to the base station in an embodiment of the present application, the target reference signal resource includes one or more scrambling identifications.

According to the base station in an embodiment of the present application, before indicating the target reference signal resource to UE through the preset signaling, the method further includes:

determining the number of the target reference signal resources according to a first preset rule.

According to the base station in an embodiment of the present application, in case that the preset signaling is the system information, the indicating the target reference signal resource to UE through the preset signaling includes:

indicating a first reference signal resource set to UE through system information for UE determining the target reference signal resource according to the first reference signal resource set, where the first reference signal resource set includes one or more reference signal resources.

According to the base station in an embodiment of the present application, the system information is associated with transmission contents or with transmission resources.

According to the base station in an embodiment of the present application, in case that the preset signaling is the system information, the indicating the target reference signal resource to UE through the preset signaling includes:

indicating a first reference signal resource set to UE through first system information, where the first reference signal resource set includes one or more reference signal resources; and indicating an index value of the target reference signal resource to UE through second system information for UE obtaining the target reference signal resource from the first reference signal resource set according to the index value.

According to the base station in an embodiment of the present application, before indicating the target reference signal resource to UE through the preset signaling, the method further includes:

receiving random access request information sent by UE.

According to the base station in an embodiment of the present application, in case that the preset signaling is the random access response information and the paging information, the indicating the target reference signal resource to UE through preset signaling includes:

indicating a first reference signal resource set to UE through the random access response information, where the first reference signal resource set includes one or more reference signal resources; and indicating an index value of the target reference signal resource to UE through the paging information for UE obtaining the target reference signal resource from the first reference signal resource set according to the index value.

According to the base station in an embodiment of the present application, in case that the preset signaling is the random access response information and the system information, the indicating the target reference signal resource to UE through preset signaling includes:

indicating a first reference signal resource set to UE through the random access response information, where the first reference signal resource set includes one or more reference signal resources; and indicating an index value of the target reference signal resource to UE through the system information for UE obtaining the target reference signal resource from the first reference signal resource set according to the index value.

According to the base station in an embodiment of the present application, after sending the reference signal to UE using the target reference signal resource, the method further includes:

indicating indication information to UE through the system information, the paging information or downlink control information, where the indication information is used for indicating a change of the first reference signal resource set.

According to the base station in an embodiment of the present application, the first reference signal resource set is a subset of a second reference signal resource set, and the second reference signal resource set refers to a set of reference signal resources configured by a base station for UE in the RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource, and the originally configured resource is a resource configured in the first reference signal resource set or a subset of the first reference signal resource set.

An embodiment of the present application provides a non-transitory computer-readable storage medium storing computer programs that, when executed by a processor, causes the processor to perform steps of the methods for signal transmission above mentioned.

According to the methods and devices for signal transmission, the terminal, the base station, and the storage medium provided in the embodiments of the present application, a reference signal resource is configured for UE in a disconnected state by means of preset signaling, and the UE receives a reference signal by means of the configured reference signal resource; thus, the performance of the system is improved, and the power consumption is reduced.

BRIEF DESCRIPTION OF THE DRAWINGS

In order to more clearly illustrate the solutions disclosed in the embodiments of the present application or the related art, the drawings used in the descriptions of the embodiments or the related art will be briefly described below. The drawings in the following description are only some embodiments of the present application.

DETAILED DESCRIPTION

Embodiments of the present application are clearly and completely described in the following with reference to the accompanying drawings in the present application. These embodiments are a part of the embodiments of the present application, and not all of the embodiments.

In a 5G NR system, the power saving design of the UE becomes very necessary, and a main reason is that the 5G NR system supports larger bandwidth, higher throughput, and more complex services and more complex processing technologies matched with them. By a power saving optimized design, the power consumption of UE can be saved, service life of the battery is prolonged, and user experience is improved and thus it is very important for 5G industrialization.

In the 5G NR system, following are three RRC states of user equipment (UE): an RRC_IDLE mode, an RRC_INACTIVE mode and a RRC_CONNECTED mode. Only a UE in RRC_CONNECTED mode is allowed to monitor a related physical downlink control channel (PDCCH), for example, a PDCCH scrambled by a cell radio network temporary identity (C-RNTI). UE power saving in the RRC_CONNECTED mode is standardized in NR Rel-16 since the power consumption of NR UE in RRC_CONNECTED mode has a decisive influence on the power consumption of the system. UE in the RRC_CONNECTED mode needs to continuously monitor the PDCCH (such as scrambled by C-RNTI) to obtain information sent on a physical downlink shared channel (PDSCH). Packet-based data flow is usually bursty, data transmission is present a period of time, but no data transmission is present for a long period of time next, and continuously monitoring the PDCCH will inevitably lead to rapid power consumption of the UE. Therefore, in case that there is no data transmission, the power consumption can be reduced by stopping the reception of the PDCCH (blind decoding of the PDCCH will be stopped at this time). Therefore, a design of 3GPP is to save power through a discontinuous reception (DRX) mechanism.

Figures 1, 2, 3:
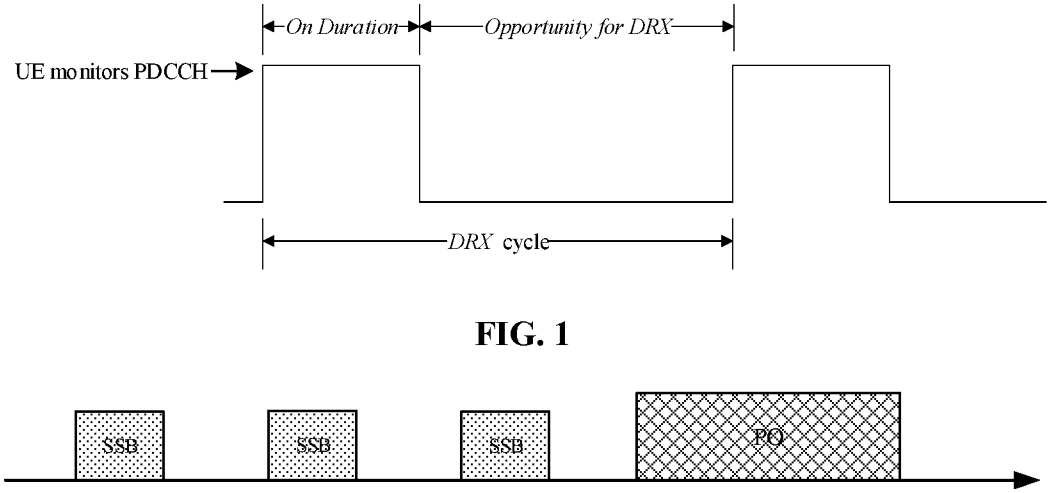
FIG. 1 is a schematic diagram showing a principle of discontinuous reception.
FIG. 2 is a schematic diagram showing a principle of SSB-based paging reception.
FIG. 3 is a first schematic diagram of a method for signal transmission according to an embodiment of the present application.

FIG. 1 is a schematic diagram showing a principle of discontinuous reception. As shown in FIG. 1, during a DRX cycle, UE monitors the PDCCH only for an On duration (DRX ON), and does not monitor the PDCCH to reduce power consumption, that is, UE enters a sleep mode during an Opportunity for DRX, that is, a DRX OFF time period.

A group common PDCCH is introduced in NR Rel-16 as an energy-saving signal before the above-mentioned DRX ON. The PDCCH is transmitted during the DRX OFF time period and scrambled with a power saving radio network temporary identity (PS-RNTI). Only when the energy-saving signal carries a UE wake-up indication, UE will wake up a receiver in the following DRX cycle, otherwise the NR Rel-16 UE will continue to sleep.

For UE in RRC_IDLE/RRC_INACTIVE modes, the base station does not know which cell UE resides in. For UEs in tracking area (TA)/RAN-based notification area (RNA), the base station or a core network will trigger a paging signal to wake up UE to enter the RRC_CONNECTED mode for receiving data, or system information updates scrambled by system information-RNTI (SI-RNTI).

For NR systems, both power saving in RRC_IDLE/RRC_INACTIVE modes and receiver robustness optimization are also very important. For low-complexity NR UEs, such as smart wearable devices or sensor devices, which mainly work in RRC_IDLE/RRC_INACTIVE modes, they have stricter requirements for power saving than ordinary NR UEs. For a UE working in RRC_IDLE/RRC_INACTIVE mode for a long time, the UE will receive paging information and system information (SI).

FIG. 2 is a schematic diagram showing a principle of SSB-based paging reception. UE needs to receive a synchronization signal block (SSB) to perform time/frequency tracking and automatic gain control (AGC) operations before receiving paging information at a paging occasion (PO). If the time between the timing at which SSB is received and PO is longer, the accuracy of the time/frequency tracking will deteriorate paging reception performance. Besides, the SSB is far away from the PO. After receiving the SSB, UE cannot sleep to save power, which increase the power consumption. In order to obtain better T/F tracking performance, considering that the PSS/SSS in the SSB only occupies 12 physical resource blocks (PRBs), multiple SSBs are often required to perform T/F tracking to improve the precision synchronization accuracy in practice, which further increase the time for UE to wake up, to increase the power consumption of UE.

In addition to paging and SI, a future evolution of the NR standard is considering the introduction of a multimedia broadcast and multicast system similar to LTE. The multimedia broadcast and multicast system is sent periodically in RRC_IDLE mode, UE is required to monitor scheduling DCI first, but since the stand alone (SA) NR system does not have a common reference signal (CRS) in the LTE system, channel tracking, which is similar to the paging, is also operated based on the SSB, and has same problems of power consumption and reception accuracy as paging operation.

In an active time for the RRC_CONNECTED mode, the base station also configures various reference signals (RS) for UE, and the RSs may include a channel state indicator (CSI)-RS for channel tracking (the NR standard includes at least CSI-RS for tracking and/or phase-tracking reference signal (PT-RS), CSI-RS for mobility measurement (called as CSI-RS for mobility in NR), and CSI-RS for channel measurement reporting. When a UE in the RRC_CONNECTED mode is configured with the discontinuous reception (DRX), it is specified in the NR standard that UE can measure the CSI-RS for mobility only during the active time, that is, the DRX ON cycle. Referring to the CSI-RS for CSI measurement reporting, it is specified in the NR standard that a most recent CSI measurement occasion must occur in the active time, and UE is unable to report CSI measurement reports during the DRX OFF time period. Whether CSI-RS for tracking, that is, a tracking reference signal (TRS), being received during DRX OFF time period depends on implementation for UE, the base station can configure a periodic TRS for UE, and may also send the TRS during the DRX OFF time period. Whether UE receiving the TRS for precision synchronization depends on the implementation algorithm for UE. For UEs in RRC_IDLE/RRC_INACTIVE modes, the base station does not know which cell the UE resides in, and there is no RRC-specific signaling similar to the connected mode. Therefore, the current NR standard cannot provide the above RS for UEs in RRC_IDLE/RRC_INACTIVE modes, and UEs are unable to use above-mentioned RS to improve the performance of the system and reduce power consumption.

3GPP does not have any solution for how to improve the reception performance and how to save power for the UE in the RRC_IDLE/RRC_INACTIVE modes of the NR system.

The embodiments of the present application are intended to design a reference signal discovery mechanism and a transmission method suitable for the NR system in RRC-Idle/inactive modes, which reduces the power consumption of UE in the NR system.

FIG. 3 is a first schematic diagram of a method for signal transmission according to an embodiment of the present application. As shown in FIG. 3, the method for signal transmission according to an embodiment of the present application can be performed by UE. The method includes:

step 301, receiving a target reference signal resource indicated by a base station through preset signaling.

The base station indicates (may also be referred to as "configures") the target reference signal resource to UE through the preset signaling. The UE receives a target reference signal resource indicated by a base station through preset signaling.

The preset signaling may be specific signaling, for example, RRC signaling, or may be non-specific signaling. The non-specific signaling refers to signaling that is not specific to configuring reference signal resources, and the preset signaling may also be broadcast signaling or multicast signaling, etc.

For example, the preset signaling includes any one or more of the following items: system information, random access response information, and paging information.

The target reference signal resource is a resource configured by the base station for UE for receiving reference signals. The contents included in the target reference signal resource may be configured according to specific application scenarios, for example, it may include time/frequency/radio/code resources for receiving reference signals, and the like.

The number of target reference signal resources may be determined by the base station according to a preset rule according to actual application scenarios.

step 302, receiving a reference signal according to the target reference signal resource.

After configuring the target reference signal resource for UE, the base station sends the reference signals to UE by using the target reference signal resource.

After receiving the target reference signal resource, UE uses the target reference signal resource to receive the reference signal sent by the base station.

The contents included in the reference signals can be configured according to the actual application, and it is not limited here.

According to the methods for signal transmission provided in the embodiments of the present application, a reference signal resource is configured for UE in a disconnected state by means of preset signaling, and the UE receives a reference signal by means of the configured reference signal resource; thus, the performance of the system is improved, and the power consumption is reduced.

Based on any of the foregoing embodiments, the preset signaling includes any one or more of the following items: system information, random access response information, and paging information.

For example, the preset signaling may be specific signaling, for example, RRC signaling, or may be non-specific signaling. The non-specific signaling refers to signaling that is not specific to configuring reference signal resources, and the preset signaling may also be broadcast signaling or multicast signaling, etc.

In an embodiment of the present application, the preset signaling includes any one or more of the following items: system information, random access response information, and paging information.

For example, the base station can send the target reference signal resource to UE through system information; the base station can further send the target reference signal resource to UE through paging information; and the base station can also send the target reference signal resource to UE through both system information and paging information.

According to the method for signal transmission in an embodiment of the present application, the preset signaling includes any one or more of the following items: system information, random access response information, and paging information, which improves performance of the system and reduces signaling overhead.

Based on any of the above embodiments, the target reference signal resource includes one or more scrambling identifications (scrambling ID).

In an embodiment of the present application, the target reference signal resource configured by the base station for UE is a resource pool, and the target reference signal resource includes one or more reference signal resources (or referred to as a “reference signal resource set”), and the number of the target reference signal resources may be determined by the base station according to a preset rule according to actual application scenarios.

Each reference signal resource includes one or more scrambling identifications (scrambling IDs). The scrambling ID is used to generate the initial sequence of the pseudo-random sequence corresponding to the reference signal. Generally, the base station will allocate the same scrambling ID to one or a group of UEs. The scrambling IDs corresponding to different beams may be different. The scrambling IDs are used to distinguish different beams in case that different beams correspond to different scrambling IDs.

In addition, each reference signal resource also includes one of the following information: a cycle of the reference signal, a pattern of the reference signal in each cycle, that is, a position in each cycle, including positions and a number of slots occupied by reference signal in each cycle, time-frequency resources mapped by the reference signal in each slot, quasi co-location (QCL) information of the reference signal. The QCL information is mainly used for indicating a beam direction of the reference signal, etc. In an embodiment, the reference signal is quasi co-located with a specific SSB, that is, the reference signal is associated with a specific SSB.

According to the method for signal transmission in an embodiment of the present application, the target reference signal resource includes one or more scrambling IDs, which further improves the performance of the system.

Based on any of the foregoing embodiments, the number of the target reference signal resources is determined by the base station according to a first preset rule.

In an embodiment of the present application, the number of the target reference signal resources is determined by the base station according to the first preset rule.

The method for configuring reference signal resource sets by the base station for UE in RRC idle/inactive modes includes that: the base station configures a first number of reference signal resource sets, and the terminal receives reference signals on a second number of reference signal resource sets, where the first number is equal to or greater than the second number.

The base station determines the number of configured reference signal resource sets according to a preset rule. For example, the base station may determine the number of reference resources according to a predefined third number. For example, the third number may be 52 or 64 PRBs. In an embodiment, when a bandwidth occupied by the first number of reference signal resource sets is greater than or equal to the third number, a reference signal resource is unable to ensure that its bandwidth is greater than the third number due to the small resident bandwidth of UE in the idle/inactive modes, the base station can regard a minimum required number of reference signal resources of which bandwidth is greater than the third number as a lower limit of the first number, or as the first number. In an embodiment, the above-mentioned method for determining the number of reference signal resources by the base station side can only refer to a scenario having one beam. Under a scenario having different transmission beams, the method for determining the number of reference signal resources by the base station can be similar to the above, and it is not excluded that multiple reference signals configured by the base station for UE correspond to different beams on the premise that a time domain interval of the reference signal resources for multiple beams is greater than a beam handover time.

According to the method for signal transmission in an embodiment of the present application, the number of the target reference signal resources is determined by the base station according to the first preset rule, which further reduce signaling overhead.

Based on any of the above embodiments, in case that the preset signaling is the system information, the receiving the target reference signal resource indicated by the base station through the preset signaling includes:

receiving a first reference signal resource set indicated by the base station through the system information, where the first reference signal resource set includes one or more reference signal resources; and determining the target reference signal resource according to the first reference signal resource set.

The NR system information is transmitted by broadcast in a cell, including a master information block (MIB) and a system information block (SIB). The SIB is divided into SIB1 and other system information (other SIBs) (currently the NR protocol includes SIB2-SIB9), of which SIB1 is also referred to as remaining minimum SI (RMSI).

The base station uses SIB to configure reference signal resource set candidates for UE in the RRC_IDLE mode. In an embodiment, the base station configures reference signal-specific SIBs, such as a first system information block SIBx, where x>=10 for UE in RRC_IDLE/RRC_INACTIVE modes. The SIBx is specific to configuring reference signals that UEs can use in RRC_IDLE/RRC_INACTIVE modes.

In the embodiments of the present application, in case that the preset signaling is the system information, the receiving the target reference signal resource indicated by the base station through the preset signaling includes the steps of:

receiving a first reference signal resource set indicated by the base station through the system information, where the first reference signal resource set includes one or more reference signal resources; and determining the target reference signal resource according to the first reference signal resource set.

In the method for signal transmission according to the embodiments of the present application, reference signal resources are configured for UE through system information, which further reduces signaling overhead.

Based on any of the foregoing embodiments, the system information is associated with transmission contents or with transmission resources.

In the embodiment of the present application, the system information may be associated with the transmission content. For example, the reference signal resource set configuration corresponding to the multimedia broadcast multicast service transmitted in RRC_IDLE/RRC_INACTIVE modes is indicated by a second system information block SIBy and the reference signal resource set configuration corresponding to other transmissions, such as paging, is indicated by SIBx. The reference signal resource set configuration will not be distinguished in the following, taking SIBx as an example for description.

In addition to associating the transmission contents with the system information block, the base station also configures SIB specific to the reference signal resource configuration in RRC_IDLE/RRC_INACTIVE modes for UE, the SIB can be associated with the transmission resource. For example, the base station configures reference signals available to UE in the RRC_IDLE/RRC_INACTIVE modes for a first resource using the first system information block SIBx and the base station configures reference signals available to UE in the RRC_IDLE/RRC_INACTIVE modes for the second resource using a second system information block SIBy. For example, the base station configures reference signals available to UE in the RRC_IDLE/RRC_INACTIVE modes for an initial bandwidth part (initial BWP) using the first system information block SIBx; or the base station configures reference signals available to UE in the RRC_IDLE/RRC_INACTIVE modes for a control resource set(CORESET) #0 using the first system information block SIBx; or the base station configures reference signals available to UE in the RRC_IDLE/RRC_INACTIVE modes for specific resources for transmitting multimedia broadcast services using the second system information block SIBy; or the base station configures reference signals available to UE in the RRC_IDLE/RRC_INACTIVE modes for specific resources for transmitting multimedia multicast services using the second system information block SIBy.

In the method for signal transmission according to the embodiments of the present application, the system information is associated with the transmission contents or with the transmission resource, which further improves the performance of the system.

Based on any of the foregoing embodiments, the determining the target reference signal resources according to the first reference signal resource set includes:

obtaining the target reference signal resource from the first reference signal resource set according to a second preset rule.

In the embodiment of the present application, the determining, by UE, the target reference signal resource according to the first reference signal resource set includes the following steps:

obtaining, by UE, the target reference signal resource from the first reference signal resource set according to a second preset rule.

The second preset rule is related to the first bandwidth for UE, a reference signal received quality for UE and a bandwidth over which UE receives the reference signal.

The first bandwidth for UE may be an activated bandwidth, a configured bandwidth, or a minimum value of the activated bandwidth and the configured bandwidth. The activated bandwidth may at least include the initial BWP or CORSET #0 bandwidth.

In the method for signal transmission according to the embodiment of the present application, the terminal can obtain the reference signal resources from the first reference signal resource set according to the second preset rule, and select the best resource for receiving the reference signal, which ensures the received quality.

Based on any of the foregoing embodiments, the obtaining the target reference signal resource from the first reference signal resource set according to a second preset rule includes:

obtaining, from the first reference signal resource set, one or more reference signal resource as the target reference signal resource according to a first threshold obtained in advance, where the target reference signal resource includes multiple resources in case that a first bandwidth for UE is smaller than the first threshold, and the target reference signal resource includes one resource in case that the first bandwidth for UE is greater than or equal to the first threshold; or obtaining, from the first reference signal resource set, one or more reference signal resource as the target reference signal resource according to a second threshold obtained in advance, where the target reference signal resource is a resource having a signal quality greater than the second threshold when UE receives a reference signal; or obtaining, from the first reference signal resource set, one or more reference signal resource as the target reference signal resource according to a first number N obtained in advance, where the target reference signal resource is N resources having a best signal quality when UE receives a reference signal or N resources having a maximum bandwidth when UE receives a reference signal; or obtaining, from the first reference signal resource set, one or more reference signal resource as the target reference signal resource according to a third threshold and a fourth threshold obtained in advance, where the target reference signal resource is a resource having a bandwidth greater than the third threshold when UE receives a reference signal and a signal quality greater than the fourth threshold.

In the embodiment of the present application, the terminal receives reference signals corresponding to all resources on the above-mentioned reference signal resource set or subsets of the resource set, or receives reference signals corresponding to some transmitted resources according to a preset rule.

UE receives a corresponding RS on the RS resource indicated by one or more base station according to the first threshold preset or notified by the base station. For example, the first threshold corresponds to the reference signal frequency domain resource bandwidth parameter, and the first threshold can be set as 52 PRBs. UE can receive one or more RS resources configured by the base station in case that the first bandwidth for UE in RRC_IDLE/Inactive modes is lower than 52 PRBs, and UE only receives the RS signal corresponding to one of the RS resources in case that the first bandwidth of the terminal is greater than 52 PRBs since the reception performance can be guaranteed only when the TRS occupies 52 PRBs according to the Rel-15. However, UE in RRC_IDLE/Inactive modes occupies a small bandwidth often less than 52 PRBs and the method is beneficial to ensure the reception performance of UE.

The first bandwidth for UE may be an activated bandwidth, a configured bandwidth, or the minimum value of the activated bandwidth and the configured bandwidth. The activated bandwidth may at least include the initial BWP or CORSET #0 bandwidth.

As another example of the base station notifying the first threshold, the first threshold may further include time domain resource information, and the time domain resource information may be a time domain gap value. For example, when UE receives reference signal resources corresponding to different beams, it must be ensured that a minimum distance in the time domain between the reference signal resource sets corresponding to different beams is greater than a pre-agreed time domain gap value, which has advantage that UE can better receive the reference signal resource sets corresponding to different beams.

UE receives a corresponding reference signal on the reference signal resource indicated by one or more base stations according to the second threshold preset or notified by the base station and the second threshold may be a measure of reference signal received quality, such as RSRP/RSRQ/RSSI etc. In one embodiment, the UE can monitor whether the reference signal received quality is greater than the threshold at the corresponding resource position, then perform operations such as channel tracking based on the reference signal in case that it is greater than the threshold, and UE only receives reference signal with reference signal received quality being greater than the threshold. In an embodiment, unlike the base station must send a reference signal after configuring the reference signal for UE in the RRC_CONNECTED mode using dedicated signaling, reference signal resources configured by the base station through the SIB are the resources configured by the base station for UE in the RRC_CONNECTED mode, and reference signal resources configured by the base station for UE in the RRC_CONNECTED mode can be specific to UE. Once UE completes this data transmission, it enters the idle/inactive mode of power saving. In this case, the base station may not continue to send the reference signal corresponding to UE in the RRC_CONNECTED mode. Since an update period of SIB is relatively large, the SIB may not have time to update the reference signal configuration, so the reference signal resource may not exist when UE actually receives it. The advantage of the present solution is that the base station configures a candidate resource pool for UE in RRC_IDLE/RRC_INACTIVE modes and provides more resource options for UE, and the UE can select the best received reference signal to ensure the received quality, at the cost that UE needs to monitor reference signal, and power consumption increases. UE also selects the reference signal resources to be received from the multiple reference signal resources notified by the base station according to the preset receiving rule.

The receiving process can also be preset. For example, the base station and UE can agree that UE only receives reference signal resource sets corresponding to four reference signal resource sets with the best received quality, or the first four with the widest bandwidth, which both have receiving bandwidths greater than a threshold and have received qualities satisfying a preset condition.

In the method for signal transmission according to the embodiment of the present application, the terminal can obtain the reference signal resources from the first reference signal resource set according to the first bandwidth, the reference signal received quality for UE, and the bandwidth over which UE receives the reference signal, etc., and select the best resource for receiving the reference signal, which ensures the received quality.

Based on any of the above embodiments, in case that the preset signaling is the system information, the receiving the target reference signal resource indicated by the base station through the preset signaling includes:

- receiving a first reference signal resource set indicated by the base station through first system information, where the first reference signal resource set includes one or more reference signal resources
- receiving an index value of the target reference signal resource indicated by the base station through second system information; and
- obtaining the target reference signal resources from the first reference signal resource set according to the index value.

In the embodiments of the present application, reference signal resources are configured for UE in RRC_IDLE/RRC_INACTIVE modes through two-stage signaling.

First, a first reference signal resource set indicated by the base station through the first system information is received, and the first reference signal resource set includes one or more reference signal resources.

Then, an index value of the target reference signal resource indicated by the base station through second system information is received.

Finally, the target reference signal resources are obtained from the first reference signal resource set according to the index value.

For example, the base station configures reference signal resource sets for UE in RRC_IDLE/Inactive modes using MIB and SIB through two-level signaling. In one embodiment, the base station configures reference signal resource sets for UE in RRC_IDLE/Inactive modes using a specific SIB, such as SIBx, where x>=10, as the first signaling and notifies UE through the SIBx period. In one embodiment, the base station notifies UE whether reference signal resource sets configured using aforementioned SIBx has changed through 1-bit reserved bit b0 in MIB or SIB1 as the second signaling. For example, b0=1 means that the latest reference signal resource set configured by the SIBx is still valid, and b0=0 means that the reference signal resource set configured by the SIBx has changed or is no longer valid and UE can no longer use the reference signal configured by the current SIBx configuration resource. In one embodiment, MIB (or SIB1) is transmitted in a short period such as 80 ms, while the SIBx is transmitted in a relatively large period, such as 640 ms. The advantages lie in that the signaling overhead of configuring the reference signal resource sets using system information can be significantly reduced, and it is beneficial for UE to obtain accurate information on the reference signal resource set a timelier configuration.

In the two-level signaling instruction method, the base station configures a preset reference signal resource set through the first signaling SIBx, and the resource set includes N reference signal resource, such as N=64 of which indexes are 0, 1, 2, . . . , N−1; and the base station notifies UE of the index corresponding to the reference signal resource set specifically used by UE through second signaling such as SIB1. In an embodiment, the base station can carry, in the SIB, an index corresponding to a reference signal resource set used by the current UE, and the reference signal resource set is an element in the reference signal resource sets configured by the aforementioned RAR. For example, the index can be expressed by 6 bits. The SIB1 is transmitted in a short period, such as 160 ms, while the SIBx is transmitted in a relatively large period, such as 10 ms, or is not transmitted unless a request from UE is received.

In the method for signal transmission according to the embodiments of the present application, reference signal resources are configured for UE through two-level system information, which can greatly reduce signaling overhead of system messages.

Based on any of the foregoing embodiments, the system information is indicated by the base station after receiving random access request information sent by UE.

In an embodiment of the present application, the system information is indicated by the base station after receiving random access request information sent by UE.

Specific PRACH resources configured by the base station for UE includes a preamble sequence and a RACH occasion (RO) for the preamble sequence. RO is defined in the NR standard as a time-frequency resource on which a preamble is sent using a specific beam. The specific PRACH resources are associated with reference signal resource sets configured for UE in RRC_IDLE/Inactive modes. UE in RRC_CONNECTED/RRC INACTIVE modes sends a specific preamble sequence on the above-mentioned specific PRACH resource and the base station sends the SIBx within the transmission time window corresponding to the SIBx after receiving the PRACH sent by UE, and does not send the SIBx before receiving a PRACH request sent by UE.

For example, the base station starts to periodically send the SIBx configured with the reference signal transmission resource set after receiving the PRACH request, or the base station sends the SIBx within the agreed time window after receiving the PRACH request, and no SIBx is sent outside the time window. In this solution, the base station does not need to send periodically the reference signal resource configuration before receiving request from UE, and it sends the reference signal resource configuration by broadcast only when UE needs it without always periodically sending information on reference signal resource configuration to UE using the SIB.

In the method for signal transmission according to the embodiment of the present application, after receiving the random access request information sent by UE, the system information is indicated, which can effectively reduce the overhead for system information.

Based on any of the foregoing embodiments, in case that the preset signaling is the random access response information and the paging information, the receiving the target reference signal resource indicated by the base station through the preset signaling includes:

- receiving a first reference signal resource set indicated by the base station through the random access response information, where the first reference signal resource set includes one or more reference signal resources;
- receiving an index value of the target reference signal resource indicated by the base station through the paging information; and
- obtaining the target reference signal resources from the first reference signal resource set according to the index value.

In the embodiments of the present application, reference signal resources are configured for UE in RRC_IDLE/RRC_INACTIVE modes through the two-stage signaling.

Specific PRACH resources configured by the base station for UE includes a preamble sequence and a RACH occasion (RO) for the preamble sequence. The specific PRACH resources are associated with reference signal resource sets configured for UE in RRC_IDLE/Inactive modes. UE in RRC_CONNECTED/RRC_INACTIVE modes sends a specific preamble sequence on the above-mentioned specific PRACH resource. After receiving the above-mentioned PRACH sent by UE, the base station notifies UE in RRC_CONNECTED/RRC_INACTIVE modes of information on reference signal resource set configuration using message 2, that is, a random access response (RAR). In this solution, the RAR is used to directly transmit the information on reference signal resource set configuration, and the overhead for system information can be greatly reduced.

Considering that transmission resources for UE in RRC_IDLE/RRC_INACTIVE modes are relatively fixed or change slowly, and the base station can complete the reference signal resource configuration together using both the RAR and paging messages.

Figure 4:
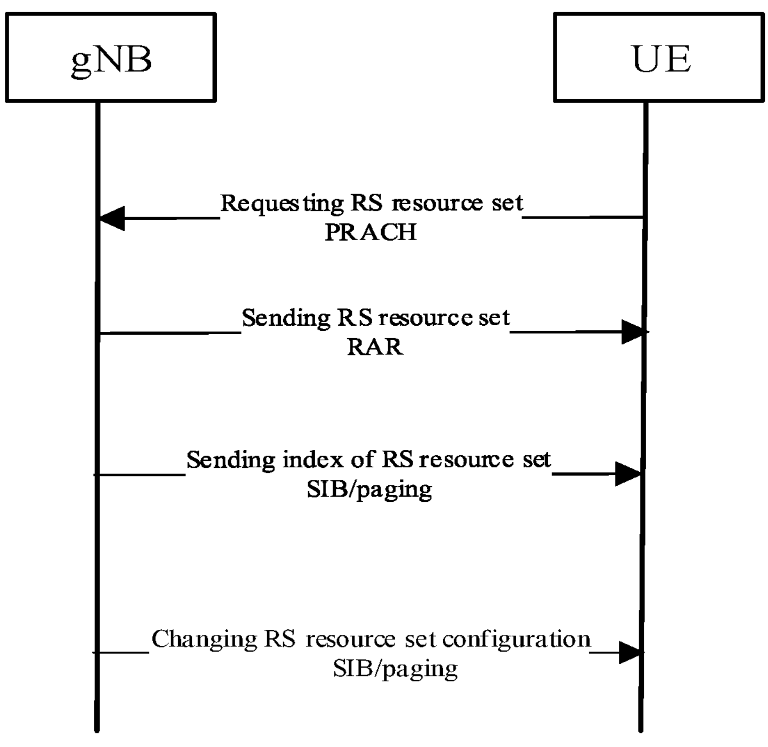
FIG. 4 is a schematic diagram of a PRACH-based reference signal resource set request and configuration according to an embodiment of the present application.

FIG. 4 is a schematic diagram of a PRACH-based reference signal resource set request and configuration according to an embodiment of the present application. As shown in FIG. 4, UE first sends the PRACH associated with the reference signal resource set to the base station. After receiving the PRACH request sent by UE, the base station may transmit the preset information on reference signal resource set configuration to UE using RAR. The resource set includes N reference signal resource sets, such as N=64, which corresponds to indexes of 0, 1, 2, . . . , N−1. The base station notifies UE of the specifically used indexes corresponding to the reference signal resource set as well as update information on the reference signal resource set through the paging message.

In the method for signal transmission according to the embodiments of the present application, configuration of reference signal resources is completed using both the RAR and paging messages, which can greatly reduce signaling overhead of system messages.

Based on any of the foregoing embodiments, in case that the preset signaling is the random access response information and the system information, the receiving the target reference signal resource indicated by the base station through the preset signaling includes:

- receiving a first reference signal resource set indicated by the base station through the random access response information, where the first reference signal resource set includes one or more reference signal resources;

receiving an index value of the target reference signal resource indicated by the base station through the system information; and obtaining the target reference signal resources from the first reference signal resource set according to the index value.

In the embodiments of the present application, reference signal resources are configured for UE in RRC_IDLE/RRC_INACTIVE modes through the two-stage signaling.

Specific PRACH resources configured by the base station for UE includes a preamble sequence and a RACH occasion (RO) for the preamble sequence. The specific PRACH resources are associated with reference signal resource sets configured for UE in RRC_IDLE/Inactive modes. UE in RRC_CONNECTED/RRC_INACTIVE modes sends a specific preamble sequence on the above-mentioned specific PRACH resource. After receiving the above-mentioned PRACH sent by UE, the base station notifies UE in RRC_CONNECTED/RRC_INACTIVE modes of information on reference signal resource set configuration using message 2, that is, a RAR. In this solution, the RAR is used to directly transmit the information on reference signal resource set configuration, and the overhead for system information can be greatly reduced.

Considering that transmission resources for UE in RRC_IDLE/RRC_INACTIVE modes are relatively fixed or change slowly, and the base station can complete the reference signal resource configuration together using both the RAR and system messages.

FIG. 4 is a schematic diagram of a PRACH-based reference signal resource set request and configuration according to an embodiment of the present application. As shown in FIG. 4, UE first sends the PRACH associated with the reference signal resource set to the base station. After receiving the PRACH request sent by UE, the base station may transmit the preset information on reference signal resource set configuration to UE using RAR. The resource set includes N reference signal resource sets, such as N=64, which corresponds to indexes of 0, 1, 2, . . . , N−1. The base station notifies UE of the specifically used indexes corresponding to the reference signal resource set as well as update information on the reference signal resource set through the system message.

In an embodiment, the base station can carry, in the SIB, an index corresponding to a reference signal resource set used by the current UE, and the reference signal resource set is an element in the reference signal resource sets configured by the aforementioned RAR. For example, the index can be expressed by 6 bits, which can significantly reduce the signaling overhead of the system message.

In the method for signal transmission according to the embodiments of the present application, configuration of reference signal resources is completed using both the RAR and system messages, which can greatly reduce signaling overhead of system messages.

Based on any of the foregoing embodiments, after receiving the reference signal according to the target reference signal resource, the method further includes:

receiving indication information indicated by the base station through the system information, the paging information or downlink control information, where the indication information is used for indicating a change of the first reference signal resource set.

In an embodiment of the present application, after receiving the reference signal according to the target reference signal resource, the method further includes:

receiving indication information indicated by the base station through system information, paging information or downlink control information, where the indication information is used for indicating a change of the first reference signal resource set.

For example, the base station can receive a system message in time using the function of notifying the change of the system message through paging to obtain indication information on the updated reference signal resource set. For another example, the base station also carries a message indicating the change of configuration information on reference signal resource set in paging or system information, the reference signal resource set includes preset N reference signal resource sets. For still another example, the base station can indicate cycles during which the reference signal resource set changes in the SIB, such as 01 represents M1 DRX/paging cycles, and 11 represents M2 DRX/paging cycles. For yet still another example, the base station may also carry information for indicating the reference signal resource set configuration information has changed through paging or the DCI that schedules paging.

The following description is given by using paging to indicate the reference signal resource set configuration information as an example. The base station indicates configuration information on reference signal resource sets using a first signaling Paging and/or PDCCH that schedules paging. In DCI format 1_0, Short Message indicator fields are present in DCI that schedules paging.

TABLE 1

Short Message indicator

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

The base station can notify UE in RRC_IDLE/RRC_INACTIVE mode of updating using the reserved status 00 in the short message indicator. Subsequent scheduling paging, that is, PDSCH includes configuration information on reference signal resource sets. Similar to the above-mentioned embodiment, the resource set includes N reference signal resource sets, such as N=64, which corresponds to indexes of 0, 1, 2, . . . , N−1; and the base station can periodically notify UE of the index corresponding to specifically used reference signal resources using the system information. In an embodiment, the base station can carry, in the second signaling SIB, an index corresponding to a reference signal resource set used by the current UE, and the reference signal resource set is an element in the reference signal resource sets configured by the aforementioned paging message. For example, the index can be expressed by 6 bits. In case that the configuration information on the reference signal resource sets changes, the base station can update configuration information on the reference signal resource sets in time through the first signaling paging and the control channel that schedules paging. Through the solution, the signaling overhead of the system information sent periodically can be significantly reduced, and especially when configuration information on the reference signal resource sets configured by the base station has a relatively large change cycle or does not change easily, UE can obtain quick notifications and indication in case that the configuration information on the reference signal resource sets changes.

In the method for signal transmission according to the embodiment of the present application, the signaling overhead of system messages can be further reduced by indicating the change of the first reference signal resource set through system information, paging information or downlink control information.

Based on any of the foregoing embodiments, the first reference signal resource set is a subset of a second reference signal resource set, and the second reference signal resource set refers to a set of reference signal resources configured by a base station for UE in the RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource and the originally configured resource is a resource configured in the first reference signal resource set or a subset of the first reference signal resource set.

In an embodiment of the present application, the first reference signal resource set is a subset of a second reference signal resource set, and the second reference signal resource set refers to a set of reference signal resources configured by a base station for UE in the RRC_CONNECTED mode.

In an embodiment, the second reference signal resource set refers to currently used reference signal resource among reference signal resource sets configured by the base station for UE in the RRC_CONNECTED mode.

For example, the base station configures a resource set A and a resource set B for UE in the RRC_CONNECTED mode, and the resources in resource set A are reference signal resources currently in use, and the resources in resource set B are not currently used and are candidate resources. The second reference signal resource set is resource set A.

In case that the first reference signal resource set is changed and no longer a subset of the second reference signal resource set, the reference signal received by UE according to the target reference signal resource is a reference signal that is continuously sent by the base station according to an originally configured resource and the originally configured resource is a resource configured in the first reference signal resource set or a subset of the first reference signal resource set.

For example, the SIBx signaling can be sent by the base station to UE in the RRC_IDLE/Inactive modes for allocating reference signal resources. In an embodiment, reference signals configured by the SIBx or time/frequency/space/code resources corresponding to the reference signal, are a subset of the reference signal resources configured by the base station for UE in the RRC_CONNECTED mode using RRC-specific signaling or MAC CE signaling or physical layer dynamic signaling, that is, in an embodiment, the reference signal is a reference signal configured by the base station for UE in the RRC-Connected mode in the cell, such as a periodic reference signal. Therefore, the signal is the reference signal being sent in the cell, and no additional transmission resource overhead will be caused because the base station provides the reference signal for UE in the RRC-IDLE mode idle mode. The solution does not exclude the case of allocating reference signal resources different from UE in the RRC_CONNECTED mode for UE in the RRC_IDLE/Inactive modes.

UE in the RRC_IDLE/Inactive modes determines the transmission resource of the reference signal to be received according to the reference signal resource set or a subset of the resource set configured by the base station. For example, the 5G standard defines different frequency domain ranges: FR1: 450 MHz-6000 MHz, FR2: 24250 MHz-52600 MHz. For the frequency range 1 (FR1), UE has only one receiving beam, and determines transmission resources of a reference signal to be received according to the reference signal resource set configured by the base station for the frequency band. For the frequency range 2 (FR2), UE has multiple receiving beams, and determines transmission resources of a reference signal to be received among a subset of reference signal resource, the subset is a reference signal resource set that satisfies a specific QCL association. In an embodiment, the so-called specific QCL association refers to the QCL association that matches the receiving beam for UE. The reference signal resource set satisfying one or more QCL associations is matched with the receiving beams for UE and UE can have a better receiving effect. For cases of several QCL associations, it is not excluded that UE can receive the reference signal corresponding to resources through beam handover.

In the method for signal transmission according to the embodiments of the present application, the first reference signal resource set is a subset of the second reference signal resource set, no additional overhead of transmission resource will be caused due to the base station providing reference signals for UE in RRC_IDLE/RRC_INACTIVE modes, and the signaling overhead of the system is further reduced.

Figure 5:
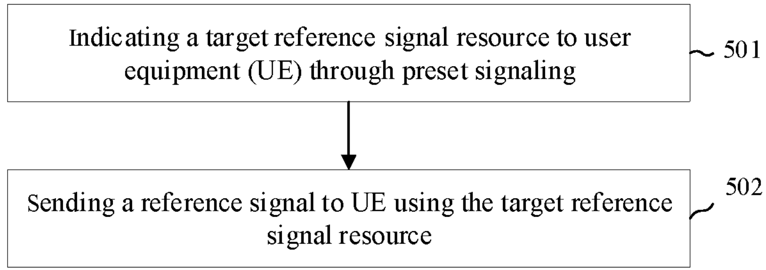
FIG. 5 is a second schematic diagram of a method for signal transmission according to an embodiment of the present application.

Based on any of the above-mentioned embodiments, FIG. 5 is a first schematic diagram of a method for signal transmission according to an embodiment of the present application. As shown in FIG. 5, the method for signal transmission according to an embodiment of the present application can be performed by a base station. The method includes:

step 501, indicating a target reference signal resource to user equipment (UE) through preset signaling; and step 502, sending a reference signal to UE using the target reference signal resource.

The method for signal transmission according to the embodiment of the present application is the same as the method for signal transmission described in the above corresponding embodiments, and can have the same effect, the difference is only that the method is performed by the base station, which will not be repeated here.

According to the methods for signal transmission provided in the embodiments of the present application, a reference signal resource is configured for UE in a disconnected state by means of preset signaling, and the UE receives a reference signal by means of the configured reference signal resource; thus, the performance of the system is improved, and the power consumption is reduced.

Based on any of the foregoing embodiments, the preset signaling includes any one or more of the following items: system information, random access response information, and paging information.

The method for signal transmission according to the embodiment of the present application is the same as the method for signal transmission described in the above corresponding embodiments, and can have the same effect, the difference is only that the method is performed by the base station, which will not be repeated here.

Based on any of the above embodiments, the target reference signal resource includes one or more scrambling identifications (scrambling ID).

The method for signal transmission according to the embodiment of the present application is the same as the method for signal transmission described in the above corresponding embodiments, and can have the same effect, the difference is only that the method is performed by the base station, which will not be repeated here.

Based on any of the foregoing embodiments, before indicating the target reference signal resource to UE through the preset signaling, the method further includes:

determining the number of the target reference signal resources according to a first preset rule.

The method for signal transmission according to the embodiment of the present application is the same as the method for signal transmission described in the above corresponding embodiments, and can have the same effect, the difference is only that the method is performed by the base station, which will not be repeated here.

Based on any of the above embodiments, in case that the preset signaling is the system information, the indicating the target reference signal resource to UE through the preset signaling includes:

indicating a first reference signal resource set to UE through system information for UE determining the target reference signal resource according to the first reference signal resource set, where the first reference signal resource set includes one or more reference signal resources.

The method for signal transmission according to the embodiment of the present application is the same as the method for signal transmission described in the above corresponding embodiments, and can have the same effect, the difference is only that the method is performed by the base station, which will not be repeated here.

Based on any of the foregoing embodiments, the system information is associated with transmission contents or with transmission resources.

The method for signal transmission according to the embodiment of the present application is the same as the method for signal transmission described in the above corresponding embodiments, and can have the same effect, the difference is only that the method is performed by the base station, which will not be repeated here.

Based on any of the above embodiments, in case that the preset signaling is the system information, the indicating the target reference signal resource to UE through the preset signaling includes:

indicating a first reference signal resource set to UE through first system information, where the first reference signal resource set includes one or more reference signal resources; and indicating an index value of the target reference signal resource to UE through second system information for UE obtaining the target reference signal resource from the first reference signal resource set according to the index value.

The method for signal transmission according to the embodiment of the present application is the same as the method for signal transmission described in the above corresponding embodiments, and can have the same effect, the difference is only that the method is performed by the base station, which will not be repeated here.

Based on any of the foregoing embodiments, before indicating the target reference signal resource to UE through the preset signaling, the method further includes:

receiving random access request information sent by UE.

The method for signal transmission according to the embodiment of the present application is the same as the method for signal transmission described in the above corresponding embodiments, and can have the same effect, the difference is only that the method is performed by the base station, which will not be repeated here.

Based on any of the foregoing embodiments, in case that the preset signaling is the random access response information and the paging information, the indicating the target reference signal resource to UE through the preset signaling includes:

indicating a first reference signal resource set to UE through the random access response information, where the first reference signal resource set includes one or more reference signal resources; and indicating an index value of the target reference signal resource to UE through the paging information for UE obtaining the target reference signal resource from the first reference signal resource set according to the index value.

The method for signal transmission according to the embodiment of the present application is the same as the method for signal transmission described in the above corresponding embodiments, and can have the same effect, the difference is only that the method is performed by the base station, which will not be repeated here.

Based on any of the foregoing embodiments, in case that the preset signaling is the random access response information and the system information, the indicating the target reference signal resource to UE through the preset signaling includes:

indicating a first reference signal resource set to UE through the random access response information, where the first reference signal resource set includes one or more reference signal resources; and indicating an index value of the target reference signal resource to UE through the system information for UE obtaining the target reference signal resource from the first reference signal resource set according to the index value.

The method for signal transmission according to the embodiment of the present application is the same as the method for signal transmission described in the above corresponding embodiments, and can have the same effect, the difference is only that the method is performed by the base station, which will not be repeated here.

Based on any of the foregoing embodiments, after sending the reference signal using the target reference signal resource, the method further includes:

indicating indication information to UE through the system information, the paging information or downlink control information, where the indication information is used for indicating a change of the first reference signal resource set.

The method for signal transmission according to the embodiment of the present application is the same as the method for signal transmission described in the above corresponding embodiments, and can have the same effect, the difference is only that the method is performed by the base station, which will not be repeated here.

Based on any of the foregoing embodiments, the first reference signal resource set is a subset of a second reference signal resource set, and the second reference signal resource set refers to a set of reference signal resources configured by a base station for UE in the RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource, and the originally configured resource is a resource configured in the first reference signal resource set or a subset of the first reference signal resource set.

The method for signal transmission according to the embodiment of the present application is the same as the method for signal transmission described in the above corresponding embodiments, and can have the same effect, the difference is only that the method is performed by the base station, which will not be repeated here.

Figure 6:
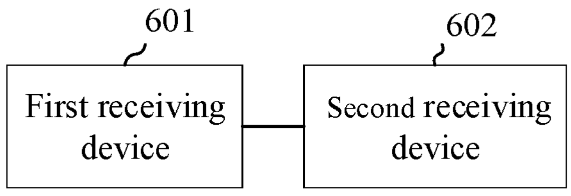
FIG. 6 is a first schematic diagram of a device for signal transmission according to an embodiment of the present application.

Based on any of the above-mentioned embodiments, FIG. 6 is a first schematic diagram of a device for signal transmission according to an embodiment of the present application. As shown in FIG. 6, the device for signal transmission according to an embodiment of the present application can perform the method for signal transmission according to the above-mentioned embodiments. The device includes: a first receiving device 601 and a second receiving device 602, in which the first receiving device 601 is configured to receive a target reference signal resource indicated by a base station through preset signaling; and the second receiving device 602 is configured to receive a reference signal according to the target reference signal resource.

The device for signal transmission according to the embodiment of the present application performs the method for signal transmission in the above embodiments including the same steps as the method for signal transmission described in the above corresponding embodiments, and can have the same effects, which will not be repeated here.

According to the device for signal transmission provided in the embodiments of the present application, a reference signal resource is configured for UE in a disconnected state by means of preset signaling, and the UE receives a reference signal by means of the configured reference signal resource; thus, the performance of the system is improved, and the power consumption is reduced.

Figure 7:
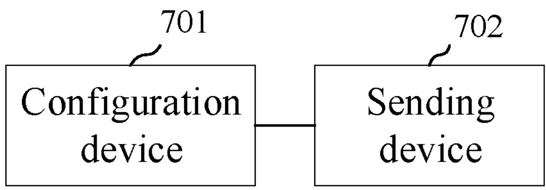
FIG. 7 is a second schematic diagram of a device for signal transmission according to an embodiment of the present application.

Based on any of the above-mentioned embodiments, FIG. 7 is a second schematic diagram of a device for signal transmission according to an embodiment of the present application. As shown in FIG. 7, the device for signal transmission according to an embodiment of the present application can perform the method for signal transmission according to the above-mentioned embodiments. The device includes: a configuration device 701 and a sending device 702, in which a configuration device 701 is configured to indicate a target reference signal resource to user equipment (UE) through preset signaling; and the sending device 702 is configured to send a reference signal to UE using the target reference signal resource.

The device for signal transmission according to the embodiment of the present application performs the method for signal transmission in the above embodiments including the same steps as the method for signal transmission described in the above corresponding embodiments, and can have the same effects, which will not be repeated here.

According to the device for signal transmission provided in the embodiments of the present application, a reference signal resource is configured for UE in a disconnected state by means of preset signaling, and the UE receives a reference signal by means of the configured reference signal resource; thus, the performance of the system is improved, and the power consumption is reduced.

Figure 8:
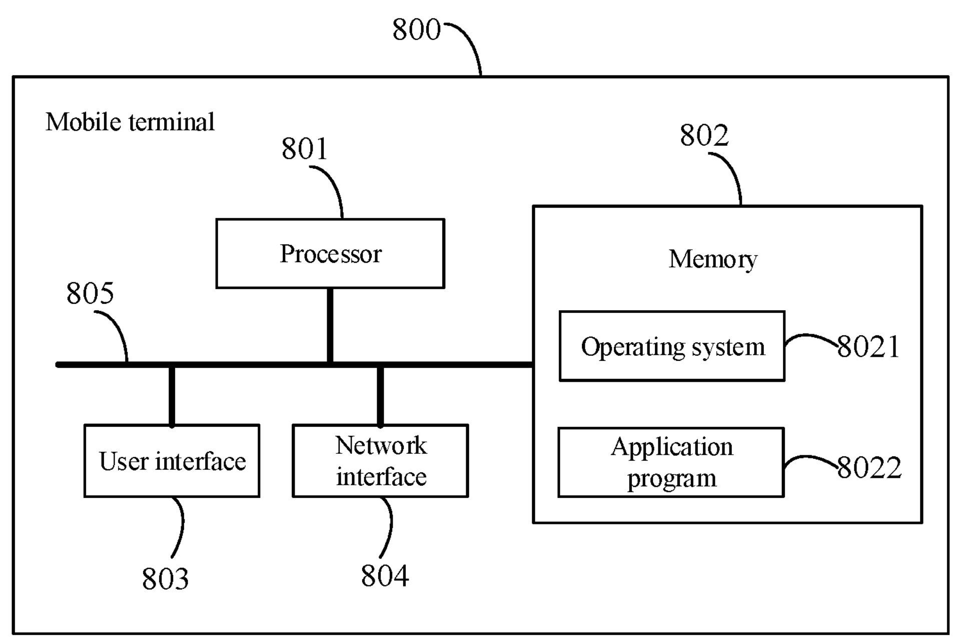
FIG. 8 is a schematic structural diagram of a mobile terminal according to an embodiment of the present application.

FIG. 8 is a schematic structural diagram of a mobile terminal according to an embodiment of the present application. As shown in FIG. 8, the mobile terminal may include at least one processor 801, a memory 802, at least one network interface 804, and other user interfaces 803. The various components in the mobile terminal 800 are coupled together through a bus system 805. It is understood that the bus system 805 is used to connect and communicate between these components. In addition to the data bus, the bus system 805 also includes a power bus, a control bus and a status signal bus. However, for clarity of illustration, the various buses are labeled as the bus system 805 in FIG. 8.

The user interface 803 may include a display, a keyboard or a pointing device, such as a mouse, a trackball, a touch pad or a touch screen, and the like.

It is to be understood that the memory 802 in the embodiments of the present application may be volatile memory or non-volatile memory, or may include both volatile and non-volatile memory. The non-volatile memory may be read-only memory (ROM), programmable read-only memory (PROM), erasable programmable read-only memory (Erasable PROM, EPROM), erase programmable read-only memory (Electrically EPROM, EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 802 in systems and methods described in various embodiments of the present application includes, but not limited to, these and any other suitable types of memory.

In some embodiments, the memory 802 stores the following elements, executable devices or data structures, or subsets thereof, or extended sets of them, such as an operating system 8021 and an application 8022.

The operating system 8021 includes various system programs, such as a framework layer, a core library layer, a driver layer, etc., for implementing various basic services and processing hardware-based tasks. The application 8022 includes various applications, such as a media player, a browser, etc., for implementing various application services. The programs for performing methods according to the embodiment of the present disclosure may be included in the application 8022.

In an embodiment of the present application, by calling the computer program or instruction stored in the memory 802, and it can be the computer program or instruction stored in the application program 8022, the processor 801 is configured for:

receiving a target reference signal resource indicated by a base station through preset signaling; and receiving a reference signal according to the target reference signal resource.

The methods disclosed in the above embodiments of the present application may be applied to the processor 801 or implemented by the processor 801. The processor 801 may be an integrated circuit chip with signal processing capability. In the implementation process, each step of the above methods may be completed by an integrated logic circuit of hardware in the processor 801 or an instruction in the form of software. The above processor 801 may be a general purpose processor, a digital signal processor (DSP), an application specific integrated circuit (ASIC), a field programmable gate array (FPGA) or other programmable logic devices, discrete gate or transistor logic devices, discrete hardware components. The disclosed methods, steps and logical block diagrams in the embodiments of the present application can be implemented or performed. A general purpose processor may be a microprocessor or the processor may be any conventional processor or the like. The steps of the methods disclosed in conjunction with the embodiments of the present application may be directly embodied as being executed by a hardware decoding processor, or being executed by a combination of hardware and software modules in the decoding processor. The software module can be located in random access memory, flash memory, read-only memory, programmable read-only memory or electrically erasable programmable memory, registers and other storage media mature in the art. The storage medium is located in the memory 802, and the processor 801 reads the information in the memory 802, and completes the steps of the above methods in combination with its hardware.

It will be appreciated that the embodiments described in this disclosure may be implemented in hardware, software, firmware, middleware, microcode, or a combination thereof. For hardware implementation, the processing unit may be implemented in one or more application specific integrated circuits (ASIC), digital signal processing (DSP), digital signal processing device (DSP Device, DSPD), programmable logic device (PLD), field-programmable gate array (FPGA), a general-purpose processor, a controller, microcontroller, microprocessor, and other for performing the functions described in this application electronic unit or a combination thereof.

For software implementation, the described techniques may be implemented through modules (for example, procedures, functions, etc.) that perform the functions described in the embodiments of the present application. Software codes may be stored in memory and executed by a processor. The memory can be implemented in the processor or external to the processor.

As another embodiment, the preset signaling includes any one or more of the following items: system information, random access response information, and paging information.

As yet another embodiment, the target reference signal resource includes one or more scrambling identifications (scrambling ID).

As still another embodiment, the number of the target reference signal resources is determined by the base station according to a first preset rule.

As still yet another embodiment, in case that the preset signaling is the system information, the receiving the target reference signal resource indicated by the base station through the preset signaling includes:

receiving a first reference signal resource set indicated by the base station through the system information, where the first reference signal resource set includes one or more reference signal resources; and determining the target reference signal resource according to the first reference signal resource set.

As still yet another embodiment, the system information is associated with transmission contents or with transmission resources.

As still yet another embodiment, the determining the target reference signal resources according to the first reference signal resource set includes:

obtaining the target reference signal resource from the first reference signal resource set according to a second preset rule.

As still yet another embodiment, the obtaining the target reference signal resource from the first reference signal resource set according to a second preset rule includes:

obtaining, from the first reference signal resource set, one or more reference signal resource as the target reference signal resource according to a first threshold obtained in advance, where the target reference signal resource includes multiple resources in case that a first bandwidth for UE is smaller than the first threshold, and the target reference signal resource includes one resource in case that the first bandwidth for UE is greater than or equal to the first threshold; or obtaining, from the first reference signal resource set, one or more reference signal resource as the target reference signal resource according to a second threshold obtained in advance, where the target reference signal resource is a resource having a signal quality greater than the second threshold when UE receives a reference signal; or obtaining, from the first reference signal resource set, one or more reference signal resource as the target reference signal resource according to a first number N obtained in advance, where the target reference signal resource is N resources having a best signal quality when UE receives a reference signal or N resources having a maximum bandwidth when UE receives a reference signal; or obtaining, from the first reference signal resource set, one or more reference signal resource as the target reference signal resource according to a third threshold and a fourth threshold obtained in advance, where the target reference signal resource is a resource having a bandwidth greater than the third threshold when UE receives a reference signal and a signal quality greater than the fourth threshold.

As still yet another embodiment, in case that the preset signaling is the system information, the receiving the target reference signal resource indicated by the base station through the preset signaling includes:

receiving a first reference signal resource set indicated by the base station through first system information, where the first reference signal resource set includes one or more reference signal resources; and receiving an index value of the target reference signal resource indicated by the base station through second system information; and obtaining the target reference signal resources from the first reference signal resource set according to the index value.

As still yet another embodiment, the system information is indicated by the base station after receiving random access request information sent by UE.

As still yet another embodiment, in case that the preset signaling is the random access response information and the paging information, the receiving the target reference signal resource indicated by the base station through the preset signaling includes:

receiving a first reference signal resource set indicated by the base station through the random access response information, where the first reference signal resource set includes one or more reference signal resources;

receiving an index value of the target reference signal resource indicated by the base station through the paging information; and obtaining the target reference signal resources from the first reference signal resource set according to the index value.

As still yet another embodiment, in case that the preset signaling is the random access response information and the system information, the receiving the target reference signal resource indicated by the base station through the preset signaling includes:

receiving a first reference signal resource set indicated by the base station through the random access response information, where the first reference signal resource set includes one or more reference signal resources;

receiving an index value of the target reference signal resource indicated by the base station through the system information; and obtaining the target reference signal resources from the first reference signal resource set according to the index value.

As still yet another embodiment, after receiving the reference signal according to the target reference signal resource, the method further includes:

receiving indication information indicated by the base station through the system information, the paging information or downlink control information, where the indication information is used for indicating a change of the first reference signal resource set.

As still yet another embodiment, the first reference signal resource set is a subset of a second reference signal resource set, and the second reference signal resource set refers to a set of reference signal resources configured by a base station for UE in the RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource, and the originally configured resource is a resource configured in the first reference signal resource set or a subset of the first reference signal resource set.

The mobile terminal according to the embodiment of the present application performs the method for signal transmission in the above embodiments including the same steps as the method for signal transmission described in the above corresponding embodiments, and can have the same effects, which will not be repeated here.

According to the mobile terminal provided in the embodiments of the present application, a reference signal resource is configured for UE in a disconnected state by means of preset signaling, and the UE receives a reference signal by means of the configured reference signal resource; thus, the performance of the system is improved, and the power consumption is reduced.

Figure 9:
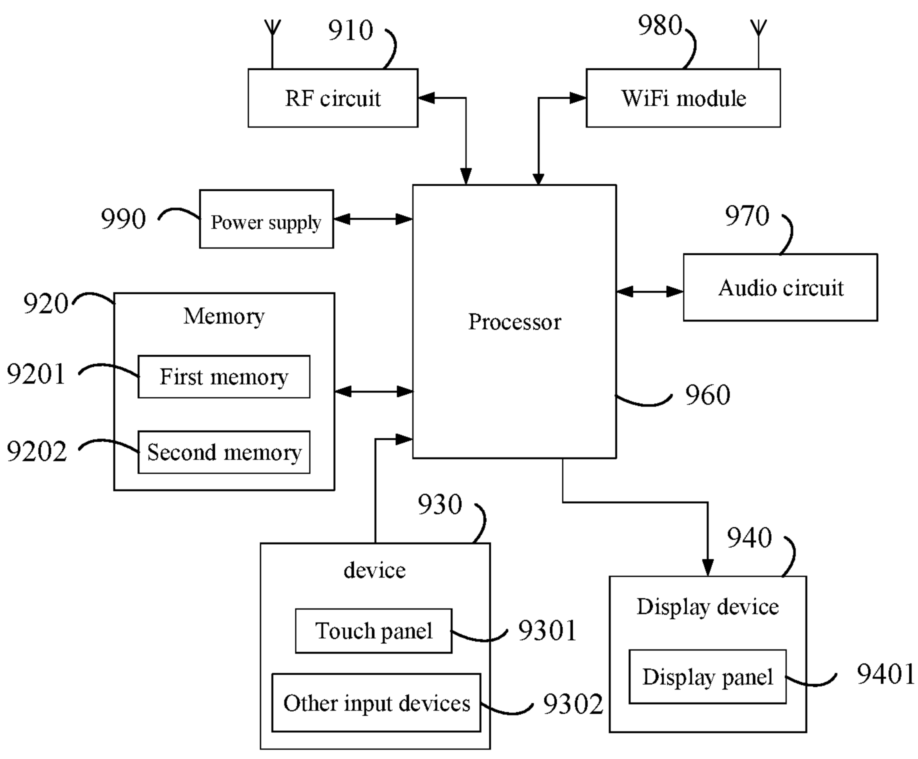
FIG. 9 is a schematic structural diagram of a mobile terminal according to another embodiment of the present application.

FIG. 9 is a schematic structural diagram of a mobile terminal according to another embodiment of the application. The mobile terminal in FIG. 9 may be a mobile phone, a tablet computer, a personal digital assistant (PDA), or an electronic reader, a handheld game console, point of sales (POS), vehicle electronic devices (vehicle computers) and the like. As shown in FIG. 9, the mobile terminal includes a radio frequency (RF) circuit 910, a memory 920, an input device 930, a display device 940, a processor 960, an audio circuit 970, a wireless fidelity (WiFi) device 980 and a power supply 990. The structure of the mobile phone shown in FIG. 9 does not constitute a limitation on the mobile phone, and may include more or less components than those shown in the figure, or combine some components, or separate some components, or have different component arrangements.

The input device 930 can be used for receiving the numerical or character information input by the user, and generating the signal input related to the user setting and function control of the mobile terminal. In this embodiment of the present application, the input device 930 may include a touch panel 9301. The touch panel 9301 is also known as the touch screen, which can collect the user's touch operations on or near it (such as the user's operations on the touch panel 9301 using any suitable objects or accessories such as fingers, stylus and the like) and drives the corresponding connection devices according to preset programs. In one embodiment, the touch panel 9301 may include a touch detection device and a touch controller. The touch detection device is configured to detect the user's touch orientation, detect the signal brought by the touch operation, and transmit the signal to the touch controller; the touch controller is configured to receive the touch information from the touch detection device, convert it into contact coordinates, and then send it to the processor 960, and can receive the commands sent by the processor 960 and execute them. In addition, the touch panel 9301 can be implemented in various types such as resistive, capacitive, infrared, and surface acoustic waves. In addition to the touch panel 9301, the input device 930 may also include other input devices 9302, which may be used to receive input numeric or character information, and generate key signal input related to user settings and function control of the mobile terminal. Specifically, other input devices 9302 may include, but not limited to, one or more of physical keyboards, function keys (such as volume control keys, switch keys and the like), trackballs, mice, joysticks, optical mice (optical mice are touch-sensitive mice that do not display visual output surface, or an extension of a touch-sensitive surface formed by a touch screen) and the like.

The display device 940 may be used to display information input by the user or information provided to the user and various menu interfaces of the mobile terminal. The display device 940 may include a display panel 9401. The display panel 9401 can be configured in the form of a liquid crystal display (LCD), an organic light-emitting diode (OLED) and the like.

It should be noted that the touch panel 9301 can cover the display panel 9401 to form a touch display screen. When the touch display screen detects a touch operation on or near it, the touch operation is transmitted to the processor 960 to determine the type of touch event, and then the processor 960 provides corresponding visual output on the touch display screen according to the type of touch event.

The touch screen includes the application program interface display area and the common control display area. The arrangement of the application program interface display area and the common control display area is not limited, and may be an arrangement that can distinguish the two display areas, such as up-down arrangement, left-right arrangement and the like. The application program interface display area can be used to display the interface of the application program. Each interface may contain at least one application icon and/or interface components such as widget desktop controls. The application program interface display area can also be an empty interface that does not contain any content. The common control display area is used to display controls with high usage rate, such as setting buttons, interface numbers, scroll bars, phonebook icons and other application icons.

The RF circuit 910 can be used for receiving and sending signals during sending and receiving information or during a call. In particular, after being received from the network side, the downlink information is processed by the processor 960. In addition, the related uplink data is sent to the network side. Typically, the RF circuit 910 includes, but not limited to, an antenna, at least one amplifier, a transceiver, a coupler, a low noise amplifier (LNA), a duplexer and the like. In addition, RF circuitry 910 may also communicate with networks and other devices via wireless communications. The wireless communication can use any communication standard or protocol, including but not limited to global system of mobile communication (GSM), general packet radio service (GPRS), code division multiple access (CDMA), wideband code division multiple access (WCDMA), long term evolution (LTE), email, short messaging service (SMS) and the like.

The memory 920 is used to store software programs and modules, and the processor 960 executes various functional applications and data processing of the mobile terminal by running the software programs and modules stored in the memory 920. The memory 920 may mainly include a stored program area and a stored data area, where the stored program area may store an operating system, an application program required for at least one function (such as a sound playback function, an image playback function, etc.) and the like; the stored data area may store the data created according to the usage of the mobile terminal (such as audio data, phone book and the like) and the like. Additionally, the memory 920 may include high-speed random access memory, and may also include non-volatile memory, such as at least one magnetic disk storage device, a flash memory device, or other volatile solid state storage device.

Herein the processor 960 is the control center of the mobile terminal, using various interfaces and lines to connect various parts of the entire mobile phone, running or executing the software programs and/or modules stored in a first memory 9201, and calling the data stored in a second memory 9202, to perform various functions of the mobile terminal and process data, to monitor the mobile terminal as a whole. In one embodiment, the processor 960 may include one or more processing units.

In this embodiment of the present application, by calling the software programs and/or modules stored in the first memory 9201 and/or data stored in the second memory 9202, the processor 960 is configured for:

receiving a target reference signal resource indicated by a base station through preset signaling; and receiving a reference signal according to the target reference signal resource.

As another embodiment, the preset signaling includes any one or more of the following items: system information, random access response information, and paging information.

As yet another embodiment, the target reference signal resource includes one or more scrambling identifications (scrambling ID).

As still another embodiment, the number of the target reference signal resources is determined by the base station according to a first preset rule.

As still yet another embodiment, in case that the preset signaling is the system information, the receiving the target reference signal resource indicated by the base station through the preset signaling includes:

receiving a first reference signal resource set indicated by the base station through the system information, where the first reference signal resource set includes one or more reference signal resources; and determining the target reference signal resource according to the first reference signal resource set.

As still yet another embodiment, the system information is associated with transmission contents or with transmission resources.

As still yet another embodiment, the determining the target reference signal resources according to the first reference signal resource set includes:

obtaining the target reference signal resource from the first reference signal resource set according to a second preset rule.

As still yet another embodiment, the obtaining the target reference signal resource from the first reference signal resource set according to a second preset rule includes:

obtaining, from the first reference signal resource set, one or more reference signal resource as the target reference signal resource according to a first threshold obtained in advance, where the target reference signal resource includes multiple resources in case that a first bandwidth for UE is smaller than the first threshold, and the target reference signal resource includes one resource in case that the first bandwidth for UE is greater than or equal to the first threshold; or obtaining, from the first reference signal resource set, one or more reference signal resource as the target reference signal resource according to a second threshold obtained in advance, where the target reference signal resource is a resource having a signal quality greater than the second threshold when UE receives a reference signal; or obtaining, from the first reference signal resource set, one or more reference signal resource as the target reference signal resource according to a first number N obtained in advance, where the target reference signal resource is N resources having a best signal quality when UE receives a reference signal or N resources having a maximum bandwidth when UE receives a reference signal; or obtaining, from the first reference signal resource set, one or more reference signal resource as the target reference signal resource according to a third threshold and a fourth threshold obtained in advance, where the target reference signal resource is a resource having a bandwidth greater than the third threshold when UE receives a reference signal and a signal quality greater than the fourth threshold.

As still yet another embodiment, in case that the preset signaling is the system information, the receiving the target reference signal resource indicated by the base station through the preset signaling includes:

receiving a first reference signal resource set indicated by the base station through first system information, where the first reference signal resource set includes one or more reference signal resources receiving an index value of the target reference signal resource indicated by the base station through second system information; and obtaining the target reference signal resources from the first reference signal resource set according to the index value.

As still yet another embodiment, the system information is indicated by the base station after receiving random access request information sent by UE.

As still yet another embodiment, in case that the preset signaling is the random access response information and the paging information, the receiving the target reference signal resource indicated by the base station through the preset signaling includes:

receiving a first reference signal resource set indicated by the base station through the random access response information, where the first reference signal resource set includes one or more reference signal resources;

receiving an index value of the target reference signal resource indicated by the base station through the paging information; and obtaining the target reference signal resources from the first reference signal resource set according to the index value.

As still yet another embodiment, in case that the preset signaling is the random access response information and the system information, the receiving the target reference signal resource indicated by the base station through the preset signaling includes:

receiving a first reference signal resource set indicated by the base station through the random access response information, where the first reference signal resource set includes one or more reference signal resources;

receiving an index value of the target reference signal resource indicated by the base station through the system information; and obtaining the target reference signal resources from the first reference signal resource set according to the index value.

As still yet another embodiment, after receiving the reference signal according to the target reference signal resource, the method further includes:

receiving indication information indicated by the base station through the system information, the paging information or downlink control information, where the indication information is used for indicating a change of the first reference signal resource set.

As still yet another embodiment, the first reference signal resource set is a subset of a second reference signal resource set, and the second reference signal resource set refers to a set of reference signal resources configured by a base station for UE in the RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource, and the originally configured resource is a resource configured in the first reference signal resource set or a subset of the first reference signal resource set.

The mobile terminal according to the embodiment of the present application performs the method for signal transmission in the above embodiments including the same steps as the method for signal transmission described in the above corresponding embodiments, and can have the same effects, which will not be repeated here.

According to the mobile terminal provided in the embodiments of the present application, a reference signal resource is configured for UE in a disconnected state by means of preset signaling, and the UE receives a reference signal by means of the configured reference signal resource; thus, the performance of the system is improved, and the power consumption is reduced.

Figure 10:
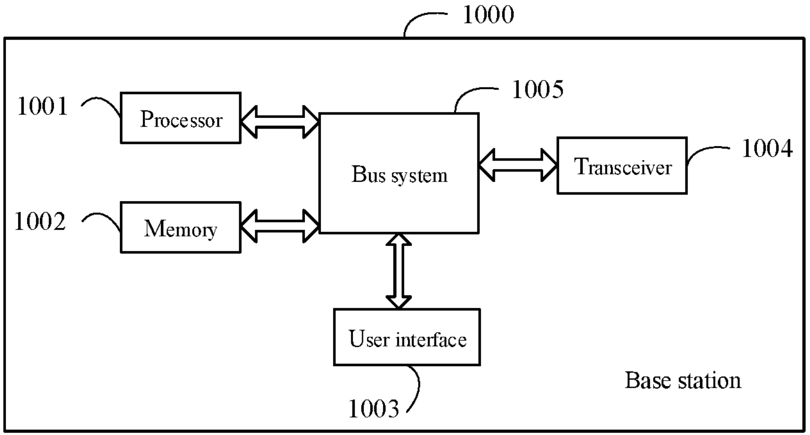
FIG. 10 is a schematic structural diagram of a base station according to an embodiment of the present application.

FIG. 10 is a schematic structural diagram of a base station according to an embodiment of the present application. As shown in FIG. 10, the base station 1000 may include at least one processor 1001, memory 1002, at least one other user interface 1003, and a transceiver 1004. Respective components in the base station 1000 are coupled together through the bus system 1005. It is understood that the bus system 1005 is used to connect and communicate between these components. In addition to the data bus, the bus system 1005 also includes a power bus, a control bus and a status signal bus. However, for the sake of clarity, in FIG. 10 respective buses are labeled as the bus system 1005, and the bus system may include any number of interconnected buses and bridges, which are linked together through various circuits of one or more processors represented by processor 1001 and one or more memories represented by the memory 1002. The bus system can also link together various other circuits, such as peripherals, voltage regulators, and power management circuits, which are well known in the art, and therefore will not be further described in the embodiments of the present application. The bus interface provides an interface. Transceiver 1004 may be a number of elements, including a transmitter and a receiver, that provide a means for communicating with various other devices over a transmission medium. For different user equipment, the user interface 1003 may also be an interface capable of externally or internally connecting the required equipment, and the connected equipment includes, but not limited to, a keypad, a display, a speaker, a microphone, a joystick, and the like.

It is to be understood that the memory 1002 in the embodiments of the present application may be volatile memory or non-volatile memory, or may include both volatile and non-volatile memory. The non-volatile memory may be read-only memory (ROM), programmable read-only memory (PROM), erasable programmable read-only memory (Erasable PROM, EPROM), erase programmable read-only memory (Electrically EPROM, EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 1002 in systems and methods described in various embodiments of the present application includes, but not limited to, these and any other suitable types of memory.

The processor 1001 is responsible for managing the bus system and general processing, and the memory 1002 can store computer programs or instructions used by the processor 1001 when performing operations.

The processor 1001 is configured for:

indicating a target reference signal resource to user equipment (UE) through preset signaling; and sending a reference signal to UE using the target reference signal resource.

The method steps disclosed in the above embodiments of the present application may be applied to the processor 1001 or implemented by the processor 1001. The processor 1001 may be an integrated circuit chip with signal processing capability. In the implementation process, each step of the above methods may be completed by an integrated logic circuit of hardware in the processor 1001 or an instruction in the form of software. The above processor 1001 may be a general purpose processor, a digital signal processor (DSP), an application specific integrated circuit (ASIC), a field programmable gate array (FPGA) or other programmable logic devices, discrete gate or transistor logic devices, discrete hardware components. The disclosed methods, steps and logical block diagrams in the embodiments of the present application can be implemented or performed. A general purpose processor may be a microprocessor or the processor may be any conventional processor or the like.

The steps of the methods disclosed in conjunction with the embodiments of the present application may be directly embodied as being executed by a hardware decoding processor, or being executed by a combination of hardware and software modules in the decoding processor. The software module can be located in random access memory, flash memory, read-only memory, programmable read-only memory or electrically erasable programmable memory, registers and other storage media mature in the art. The storage medium is located in the memory 1002, and the processor 1001 reads the information in the memory 1002, and completes the steps of the above methods in combination with its hardware.

It will be appreciated that the embodiments described in this disclosure may be implemented in hardware, software, firmware, middleware, microcode, or a combination thereof. For hardware implementation, the processing unit may be implemented in one or more application specific integrated circuits (ASIC), digital signal processing (DSP), digital signal processing device (DSP Device, DSPD), programmable logic device (PLD), field-programmable gate array (FPGA), a general-purpose processor, a controller, microcontroller, microprocessor, and other for performing the functions described in this application electronic unit or a combination thereof.

For software implementation, the described techniques may be implemented through modules (for example, procedures, functions, etc.) that perform the functions described in the embodiments of the present application. Software codes may be stored in memory and executed by a processor. The memory can be implemented in the processor or external to the processor.

As another embodiment, the preset signaling includes any one or more of the following items: system information, random access response information, and paging information.

As yet another embodiment, the target reference signal resource includes one or more scrambling identifications (scrambling ID).

As still yet another embodiment, before indicating the target reference signal resource to UE through the preset signaling, the method further includes:

determining the number of the target reference signal resources according to a first preset rule.

As still yet another embodiment, in case that the preset signaling is the system information, the indicating the target reference signal resource to UE through the preset signaling includes:

indicating a first reference signal resource set to UE through system information for UE determining the target reference signal resource according to the first reference signal resource set, where the first reference signal resource set includes one or more reference signal resources.

As still yet another embodiment, the system information is associated with transmission contents or with transmission resources.

As still yet another embodiment, in case that the preset signaling is the system information, the indicating the target reference signal resource to UE through the preset signaling includes:

indicating a first reference signal resource set to UE through first system information, where the first reference signal resource set includes one or more reference signal resources; and indicating an index value of the target reference signal resource to UE through second system information for UE obtaining the target reference signal resource from the first reference signal resource set according to the index value.

As still yet another embodiment, before indicating the target reference signal resource to UE through the preset signaling, the method further includes:

receiving random access request information sent by UE.

As still yet another embodiment, in case that the preset signaling is the random access response information and the paging information, the indicating the target reference signal resource to UE through the preset signaling includes:

indicating a first reference signal resource set to UE through the random access response information, where the first reference signal resource set includes one or more reference signal resources; and indicating an index value of the target reference signal resource to UE through the paging information for UE obtaining the target reference signal resource from the first reference signal resource set according to the index value.

As still yet another embodiment, in case that the preset signaling is the random access response information and the system information, the indicating the target reference signal resource to UE through the preset signaling includes:

indicating a first reference signal resource set to UE through the random access response information, where the first reference signal resource set includes one or more reference signal resources; and indicating an index value of the target reference signal resource to UE through the system information for UE obtaining the target reference signal resource from the first reference signal resource set according to the index value.

As still yet another embodiment, after sending the reference signal using the target reference signal resource, the method further includes:

indicating indication information to UE through the system information, the paging information or downlink control information, where the indication information is used for indicating a change of the first reference signal resource set.

As still yet another embodiment, the first reference signal resource set is a subset of a second reference signal resource set, and the second reference signal resource set refers to a set of reference signal resources configured by a base station for UE in the RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource, and the originally configured resource is a resource configured in the first reference signal resource set or a subset of the first reference signal resource set.

The base station according to the embodiment of the present application performs the method for signal transmission in the above embodiments including the same steps as the method for signal transmission described in the above corresponding embodiments, and can have the same effects, which will not be repeated here.

According to the base station provided in the embodiments of the present application, a reference signal resource is configured for UE in a disconnected state by means of preset signaling, and the UE receives a reference signal by means of the configured reference signal resource; thus, the performance of the system is improved, and the power consumption is reduced.

The solutions according to the embodiments of the present disclosure have been described from the perspective of electronic devices (the mobile terminal and a base station). It can be understood that, in order to provide the above-mentioned functions, the electronic device provided by the embodiments of the present disclosure includes corresponding hardware structures and/or software modules for executing each function. The present disclosure can be implemented in hardware or a combination of hardware and computer software with the units and algorithm steps of each example described in conjunction with the embodiments disclosed in the present disclosure.

Whether a function is executed by a computer software or driving hardware depends on the specific application and design constraint conditions of the embodiments. Professionals and technicians can use different methods for each specific application to implement the described functions, but such implementation should not be considered beyond the scope of the present application.

In the embodiments of the present disclosure, functional modules can be divided into electronic devices and the like according to the foregoing method examples. For example, each functional module can be divided corresponding to each function, or two or more functions can be integrated into a processing device. The above-mentioned integrated unit can be implemented in the form of hardware or software functional unit.

It should be noted that, the division of modules in the embodiments of the present disclosure is schematic, and is only a logical function division, and there may be other division manners in actual implementation.

The above-mentioned functional modules is used for illustration. In practical applications, the above-mentioned functions can be allocated to different functional modules as required. The internal structure of the device is divided into different functional modules to complete all or part of the functions described above. For the specific working process of the system, apparatus and unit described above, reference may be made to the corresponding process in the foregoing method embodiments, and details are not described herein again.

In the several embodiments provided in the present disclosure, it should be understood that the disclosed device and method may be implemented in other manners. For example, the device embodiments described above are only illustrative. For example, the division of the modules or units is only a logical function division and there may be other division methods in actual implementation. For example, multiple units or elements may be Incorporation may either be integrated into another system, or some features may be omitted, or not implemented. On the other hand, the shown or discussed mutual coupling or direct coupling or communication connection may be indirect coupling or communication connection of devices or units through some interfaces.

The units described as separate components may or may not be physically separate, and the components displayed as units may or may not be physical units, that is, may be located at the same place, or it can be distributed to multiple network units. Some or all of the units may be selected according to actual needs of the present embodiment.

In addition, the functional units in the various embodiments of the present application may be integrated into one processing unit, or each unit may exist alone physically, or two or more units may be integrated into one unit. The above-mentioned integrated units may be implemented in the form of software functional units.

If the integrated unit is implemented in the form of a software functional unit and sold or used as an independent product, it can be stored in a computer readable storage medium. Based on such understanding, a part of or all the solutions may be embodied in the form of a software product, which is stored in a storage medium, including several instructions to cause a computer device (which may be a personal computer, server, or network device, etc.) to perform all or part of the steps of the methods described in the respective embodiments of the present application. The computer storage medium is a non-transitory medium, including: flash memory, removable hard disk, read-only memory, random access memory, magnetic disk or optical disk and other mediums that can store program codes.

In an another embodiment, a computer program product is provided, including: a computer program stored on a non-transient computer readable storage medium, the computer program includes program instructions, when executed by a computer, causing the computer to perform the method for signal transmission described above. The method includes:

receiving a target reference signal resource indicated by a base station through preset signaling, and receiving a reference signal according to the target reference signal resource; or indicating a target reference signal resource to user equipment (UE) through preset signaling; and sending a reference signal to UE using the target reference signal resource.

The present application provides a non-transitory computer-readable storage medium having stored thereon computer programs, that, when executed by a processor, causes the processor to perform the steps of the method mentioned above according to the embodiments, and the method includes:

receiving a target reference signal resource indicated by a base station through preset signaling, and receiving a reference signal according to the target reference signal resource; or indicating a target reference signal resource to user equipment (UE) through preset signaling; and sending a reference signal to UE using the target reference signal resource.

What is claimed is:

1. A method for signal transmission, performed by user equipment (UE), comprising:

receiving a target reference signal resource indicated by a base station through preset signaling; and receiving a reference signal according to the target reference signal resource, wherein the UE is in RRC_idle/RRC_inactive mode, and the reference signal is a periodic tracking reference signal (TRS);

wherein in case that the preset signaling includes the system information, the receiving the target reference signal resource indicated by the base station through the preset signaling comprises: receiving a first reference signal resource set indicated by the base station through the system information, wherein the first reference signal resource set comprises one or more reference signal resources; and determining the target reference signal resource according to the first reference signal resource set;

wherein the method further comprises after receiving the reference signal according to the target reference signal resource, receiving indication information indicated by the base station through the paging information, wherein the indication information is used for indicating a change of the first reference signal resource set.

2. The method of claim 1, wherein the target reference signal resource comprises one or more scrambling identifications.

3. The method of claim 1, wherein the number of the target reference signal resources is determined by the base station according to a first preset rule.

4. The method of claim 1, wherein the receiving the target reference signal resource indicated by the base station through the system information comprises receiving a first reference signal resource set indicated by the base station through first system information;

determining the target reference signal resource according to the first reference signal resource set comprises:

receiving an index value of the target reference signal resource indicated by the base station through second system information; and obtaining the target reference signal resources from the first reference signal resource set according to the index value; or in case that the preset signaling is the random access response information and the system information, the receiving the target reference signal resource indicated by the base station through the preset signaling comprises:

receiving a first reference signal resource set indicated by the base station through the random access response information, wherein the first reference signal resource set comprises one or more reference signal resources;

receiving an index value of the target reference signal resource indicated by the base station through the system information; and obtaining the target reference signal resources from the first reference signal resource set according to the index value.

5. The method of claim 1, wherein the preset signaling further comprises any one or more of the following items: random access response information, and paging information.

6. The method of claim 1, wherein the determining the target reference signal resources according to the first reference signal resource set comprises:

obtaining the target reference signal resource from the first reference signal resource set according to a second preset rule.

7. The method of claim 6, wherein the obtaining the target reference signal resource from the first reference signal resource set according to the second preset rule comprises:

obtaining, from the first reference signal resource set, one or more reference signal resource as the target reference signal resource according to a first threshold obtained in advance, wherein the target reference signal resource comprises multiple resources in case that the first bandwidth for a user equipment (UE) is smaller than the first threshold, and the target reference signal resource comprises one resource in case that the first bandwidth for UE is greater than or equal to the first threshold; or obtaining, from the first reference signal resource set, one or more reference signal resource as the target reference signal resource according to a second threshold obtained in advance, wherein the target reference signal resource is a resource having a signal quality greater than the second threshold when UE receives a reference signal; or obtaining, from the first reference signal resource set, one or more reference signal resource as the target reference signal resource according to a first number N obtained in advance, wherein the target reference signal resource is N resources having a best signal quality when UE receives a reference signal or N resources having a maximum bandwidth when UE receives a reference signal; or obtaining, from the first reference signal resource set, one or more reference signal resource as the target reference signal resource according to a third threshold and a fourth threshold obtained in advance; wherein the target reference signal resource is a resource having a bandwidth greater than the third threshold and a signal quality greater than the fourth threshold when UE receives a reference signal.

8. The method of claim 1, wherein the first reference signal resource set is a subset of a second reference signal resource set, and the second reference signal resource set refers to a set of reference signal resources configured by a base station for UE in an RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource, and the originally configured resource is a resource configured in the first reference signal resource set or a subset of the first reference signal resource set.

9. A method for signal transmission, performed by a base station, comprising:

indicating a target reference signal resource to user equipment (UE) through preset signaling; and sending a reference signal to UE using the target reference signal resource, wherein UE is in RRC idle/RRC inactive mode, and the reference signal is a periodic tracking reference signal (TRS);

wherein in case that the preset signaling includes the system information, the indicating a target reference signal resource to UE through preset signaling comprises: indicating a first reference signal resource set to UE through system information for UE determining the target reference signal resource according to the first reference signal resource set, wherein the first reference signal resource set comprises one or more reference signal resources;

wherein the method further comprises after sending the reference signal to UE using the target reference signal resource, indicating indication information to UE through the paging information, wherein the indication information is used for indicating a change of the first reference signal resource set.

10. The method of claim 9, wherein the target reference signal resource comprises one or more scrambling identifications.

11. The method of claim 9, further comprising: before indicating the target reference signal resource to UE through the preset signaling, determining the number of the target reference signal resources according to a first preset rule.

12. The method of claim 9, wherein the indicating a target reference signal resource to UE through the system information comprises indicating a first reference signal resource set to UE through first system information; and the method further comprises indicating an index value of the target reference signal resource to UE through second system information for UE obtaining the target reference signal resource from the first reference signal resource set according to the index value; or in case that the preset signaling is the random access response information and the system information, the indicating the target reference signal resource to UE through preset signaling comprises:

indicating a first reference signal resource set to UE through the random access response information, wherein the first reference signal resource set comprises one or more reference signal resources; and indicating an index value of the target reference signal resource to UE through the system information for UE obtaining the target reference signal resource from the first reference signal resource set according to the index value.

13. The method of claim 9, wherein the preset signaling further comprises any one or more of the following items: random access response information, and paging information.

14. The method of claim 9, wherein the first reference signal resource set is a subset of a second reference signal resource set, and the second reference signal resource set refers to a set of reference signal resources configured by a base station for UE in an RRC_CONNECTED mode;

in case that the first reference signal resource set is changed and no longer a subset of the second reference signal resource set, the reference signal received by UE according to the target reference signal resource is a reference signal that is continuously sent by the base station according to an originally configured resource, and the originally configured resource is a resource configured in the first reference signal resource set or a subset of the first reference signal resource set.

15. A user equipment (UE), comprising: a processor, and a memory storing programs that are executable by the processor, wherein the programs, when executed by the processor, cause the processor to perform the following steps of:

receiving a target reference signal resource indicated by a base station through preset signaling; and receiving a reference signal according to the target reference signal resource, wherein UE is in RRC idle/RRC_inactive mode, and the reference signal is a periodic tracking reference signal (TRS);

wherein in case that the preset signaling includes the system information, the receiving the target reference signal resource indicated by the base station through the preset signaling comprises: receiving a first reference signal resource set indicated by the base station through the system information, wherein the first reference signal resource set comprises one or more reference signal resources; and determining the target reference signal resource according to the first reference signal resource set;

wherein the method further comprises after receiving the reference signal according to the target reference signal resource, receiving indication information indicated by the base station through the paging information, wherein the indication information is used for indicating a change of the first reference signal resource set.

16. A base station, comprising: a processor, and a memory storing programs that are executable by the processor, wherein the programs, when executed by the processor, cause the processor to perform steps of claim 9.

* * * * *